United States Patent
Maes et al.

(10) Patent No.: US 11,394,936 B2
(45) Date of Patent: Jul. 19, 2022

(54) CLOSED LOOP DRIVING OF A HIGHLIGHTER TYPE PROJECTOR

(71) Applicant: BARCO N.V., Kortrijk (BE)

(72) Inventors: Dirk Maes, Bissegem (BE); Peter Gerets, Roeselare (BE); Gerwin Damberg, Vancouver (CA)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 17/053,903

(22) PCT Filed: May 7, 2019

(86) PCT No.: PCT/EP2019/061753
§ 371 (c)(1),
(2) Date: Nov. 9, 2020

(87) PCT Pub. No.: WO2019/215202
PCT Pub. Date: Nov. 14, 2019

(65) Prior Publication Data
US 2021/0281807 A1    Sep. 9, 2021

(30) Foreign Application Priority Data
May 8, 2018  (GB) .................................... 1807461

(51) Int. Cl.
*H04N 9/31*    (2006.01)

(52) U.S. Cl.
CPC ......... *H04N 9/3126* (2013.01); *H04N 9/3155* (2013.01); *H04N 9/3161* (2013.01); *H04N 9/3194* (2013.01)

(58) Field of Classification Search
CPC .......... G03B 17/54; G03B 21/005–008; G03B 21/00; G03B 21/40; G03B 21/12;
(Continued)

(56) References Cited

U.S. PATENT DOCUMENTS

| 5,978,142 A | 11/1999 | Blackham et al. |
| 2004/0145792 A1 | 7/2004 | Maeyama et al. |

(Continued)

FOREIGN PATENT DOCUMENTS

| WO | 2012145200 A1 | 10/2012 |
| WO | 2015054797 A1 | 4/2015 |
| WO | 2018064374 A1 | 4/2018 |

OTHER PUBLICATIONS

International Preliminary Report on Patentability in corresponding PCT Application No. PCT/EP2019/061753, dated Nov. 19, 2020.
(Continued)

*Primary Examiner* — John W Miller
*Assistant Examiner* — Humam M Satti
(74) *Attorney, Agent, or Firm* — Hamre, Schumann, Mueller & Larson, P.C.

(57) ABSTRACT

A method for driving a projection system and a projection system including a phase modulator and at least one amplitude modulator. The phase modulator is configured to generate a highlight image incident on the amplitude modulator, the projector system further includes at least one image sensor configured to receive at least a portion of an illumination pattern substantially equivalent to the illumination pattern incident on the amplitude modulator, and the image sensor is being used to provide feedback to the controller of the projection system to improve the highlights projected by the projection system.

22 Claims, 10 Drawing Sheets

(58) Field of Classification Search
CPC .... G03B 21/13; G03B 21/147; H04N 13/365; H04N 5/74; H04N 5/7475; H04N 5/7408; H04N 9/31–317; H04N 9/3182; H04N 9/3185; H04N 9/3188; G02B 13/16; G02B 21/36; G02B 27/18
See application file for complete search history.

(56) References Cited

U.S. PATENT DOCUMENTS

| | | | |
|---|---|---|---|
| 2005/0083523 A1* | 4/2005 | Senturia | G01J 3/42 356/323 |
| 2007/0058143 A1 | 3/2007 | Penn et al. | |
| 2008/0273234 A1* | 11/2008 | Mehrl | G02B 26/0841 359/223.1 |
| 2012/0206695 A1* | 8/2012 | Olsen | G03B 21/208 353/30 |
| 2017/0078629 A1* | 3/2017 | Kozak | H04N 9/3147 |
| 2017/0085846 A1 | 3/2017 | Damberg et al. | |
| 2017/0254932 A1 | 9/2017 | Huang et al. | |
| 2017/0357100 A1* | 12/2017 | Ouderkirk | F21V 5/02 |
| 2018/0007327 A1 | 4/2018 | Richards et al. | |
| 2018/0160051 A1* | 6/2018 | Schaefer | H04N 5/265 |
| 2019/0049825 A1* | 2/2019 | Kodama | G09G 3/3611 |
| 2019/0172423 A1* | 6/2019 | Kurokawa | H04N 9/3194 |
| 2020/0288093 A1* | 9/2020 | Pertierra | H04N 9/3188 |
| 2020/0336713 A1* | 10/2020 | Davies | H04N 9/3126 |

OTHER PUBLICATIONS

ISR and Written Opinion for PCT/EP2019/061753 dated Aug. 28, 2019.

Search report for priority application GB1807461.7 dated Nov. 6, 2018.

Gerwin Damberg and James Gregson, "High Brightness HDR Projection Using Dynamic Freeform Lensing," in ACM Transactions on Graphics in Jun. 2016, pp. 1-11.

Hoskinson and Stoeber, "High-dynamic range image projection using an auxiliary MEMS mirror array," Optical Society of America, 2008.

* cited by examiner

CLOSED LOOP DRIVING OF A HIGHLIGHTER TYPE PROJECTOR

FIELD OF THE INVENTION

The present invention pertains to the field of lightsteered projectors, to methods for controlling such projectors and software for implementing such methods.

BACKGROUND

Current projectors are often based on so called "light valve technology". A light valve is an amplitude spatial modulator. The entire light valve is uniformly illuminated and the light valve (LCD, DLP or LCOS) blocks e.g. redirects light to a dump, i.e. light which is not needed. Two main disadvantages come with this:

1/for an average video signal a significant amount of light energy is wasted because it is dumped 2/the ability to block light is not perfect and still a minor amount of light is leaking when the image is supposed to be black. This reduces the contrast ratio. i.e. the dynamic range.

Currently there is a desire for displays, including projection displays to be capable of producing a Higher Dynamic Range (HDR). This means darker black levels and higher peak brightness levels. This will enable more details in black and a more adequate representation of the image highlights. It is however not the intention that the average picture brightness is much increased because this will mainly force eye adaptation to a different level, might even be painful, but does not benefit the perceived dynamic range.

Usually, when increasing peak brightness, the black level also is raised and since more information is encoded near black, this is highly undesirable. A cascade of 2 light valves has been proposed in U.S. Pat. No. 5,978,142. While this approach is effective to lower the light leakage in black, it also significantly affects the light throughput efficiency as losses in the first light valve, the imaging optics, mirrors . . . easily reduce the peak brightness by 50%.

Further, in a typical High Dynamic Range signal, the ratio between peak brightness and average brightness becomes even larger, so an even bigger amount of the light energy will be blocked.

A much more efficient approach towards an HDR projector is one where only the second modulator is of the light valve type and where the first modulator distributes the light where it is needed. The light being distributed, or redirected, by the first modulator is the steered light. This solution delivers both better blacks and higher peak whites for the same amount of illumination light input.

Such an approach where the first modulator is based on a phase modulating LCOS device has been proposed in WO2015054797.

An approach where an analogue MEMs device is used as the first modulator is described in a paper from Hoskinson and Stoeber: High-dynamic range image projection using an auxiliary MEMS mirror array published in 2008 in Optical Society of America.

An approach to predict via simulations the resulting brightness pattern on the second modulator starting from the phase pattern on the first modulator has been proposed by MTT Innovation in a paper from Gerwin Damberg and James Gregson: High Brightness HDR Projection Using Dynamic Freeform Lensing published in ACM Transactions on Graphics in June 2016. This model further introduces an amount of smoothness using a blur kernel to take into account the limited image sharpness caused by limitations in the beam quality of the laser sources and the additional blurring introduced by a diffuser at the intermediate image plane. As additional references will be made to this paper throughout the description, we will refer to it as *Damberg and Gregson, ACM,* 2016.

The geometric distortions introduced by the setup and the optics between the phase modulator and the amplitude modulator can be compensated by introducing a warping function to warp the image plane backwards onto the lens plane.

Both in the case of an LCOS phase modular and in the case of a MEM's light steering device there is an analogue first modulator used, where the response to a certain driving signal depends on many influencing factors, such as manufacturing tolerances in the device itself, its operating temperature, aging, . . . . Deformable mirrors and MEMs additionally show some degree of hysteresis. The effect of a new driving signal applied depends to some extent on its previous conditions. For mirrors with a continuous membrane, there is also an influence of the position of adjacent elements.

The application of light steering requires very high accuracy of the deflection angle, because a small angular deviation can introduce a significant error in on screen brightness of a certain pixel. And if three separate channels are used per color, this will result in color errors that are even more visible.

Further, the final result from the light steering depends not only on the amount of steering by the first modulator but as well upon the spatial distribution as well as the angular distribution of the (laser) light that is incident on it. If there is any change in those illumination characteristics the steered light pattern will change. In the case where a phase modulator is used as the light steering device also a change in laser wavelength will affect the final result.

If multiple discrete laser sources are combined to illuminate the light steering, differential aging between those sources might also affect the light steered pattern.

Also, any drift in the optical path between the first and the second modulator, will create false assumptions on where exactly the light steered pattern is imaged on the second modulator.

As further described in the paper *Damberg and Gregson, ACM,* 2016, they make use of the forward image formation model from their simulations to predict the illumination profile present at the second, amplitude-only modulator. Given the phase function from the freeform lensing algorithm, the light distribution on the image plane is predicted using the simple model described in the paper. The amount of smoothness introduced at the diffuser at the intermediate image plane can be modelled using a blur kernel (e.g. system point spread function that can be either directly measured or computed via deconvolution for known targets) and the modulation pattern required for the amplitude modulator is then obtained to introduce any missing spatial information as well as additional contrast where needed.

They further describe the use of a one-time calibration and characterization of the entire optical system which is required to optimally control the spatial light modulator.

It is unlikely that the one-time calibration will be sufficient and adequate to compensate for all the effects described above. Frequent recalibrations are expected to be required for critical applications. Further calibration at different temperature points and different laser power levels might be needed.

The part of the light that still ends up in the active area, even if it is attempted to steer all the light outside the active area, is not fully static. It was found that some of this "unsteered light" depends upon the phase pattern used. A partial explanation for this behaviour can be found in the fringe field phenomenon known in LCOS devices. Even if the centre of each pixel is driven to deliver the desired phase retardation, at the transition between this pixel and the adjacent pixels, the resulting electrical field is influenced by both pixels. Light incident at these transition zones will not be steered correctly. Yet it is very difficult to predict where exactly it will end up.

A similar problem occurs when a pixel has to transition from a phase A in a first frame to a phase B in a second frame. A one-time calibration might yield the desired light steered pattern in a static situation at phase A and also in a static situation at phase B. In the transition period light could end up in undesired positions. And the precise transition time and what happens in between is almost impossible to predict. A solution could be to blank the laser source during the transition period, this however affects the light output available for light steering.

Adaptive optics has been used in high-end telescopes, where a deformable mirror or a MEMs device is dynamically driven to compensate for the aberrations imposed by the atmosphere.

The mirror dynamically corrects the wavefront to deliver a better image. Such devices typically are also equipped with a wavefront sensor (sensing both amplitude and phase) and driven in closed loop to compensate for effects such as hysteresis and cross coupling of the MEMs pixels. The wavefront is adjusted in both amplitude and phase through an iterative process. However, such an iterative solution is very slow, and does not seem to be practical for video applications. Further again it would be required to blank the laser until the desired result is available.

SUMMARY OF THE INVENTION

It is an object of the present invention to provide a method of driving a projector system that can comprise a phase modulator and at least one amplitude modulator. The phase modulator can be configured to generate a highlight image incident on the amplitude modulator. The projector system can comprise at least one image sensor configured to receive at least a portion of an illumination pattern substantially equivalent to the illumination pattern incident on the amplitude modulator. The method can comprise the steps of
1) receiving an input image,
2) generating a target highlight image, a target image and power control signals from the input image,
   a) generating a phase pattern for driving the phase modulator from the target highlight image,
   b) generating a predicted illumination profile image from the target highlight image,
   c) generating an amplitude pattern for driving the amplitude modulator from the predicted illumination profile image and the target image,
3) receiving an image from the image sensor to provide feedback to at least one of the method steps 2), 2b), 2c) for driving the projector system.

This has the advantage of improving the image or output signal. The image sensor is used to provide feedback to the controller of the projection system and thereby improve the highlights projected by the projection system. This has the advantage that all the artefacts which are not taken into account in the target highlight image, such as a fixed texture, diffraction artefacts, and the DC component of the unsteered illumination, any drift in the opto-mechanics, the phase modulator and/or the laser source, are now incorporated into the feedback loop by means of the images acquired in real time or near real time.

Standard movies have an average brightness level of around 8% (Information gathered by Real-D). Around 92% of the light energy of the laser light source is thus blocked.

For HDR there is a desire to significantly increase the peak brightness level to offer a realistic impression of sunlight reflections and light sources, however without increasing the average brightness level. In this case the laser source has to become significantly more powerful while the light valve blocks even a higher percentage of the light. This is expensive and inefficient.

A light steering approach is promising to be much more effective, and the additional cost of the light steering modulator stage can easily be offset by the savings in laser cost and electricity consumption, especially for high brightness cinema projectors.

However, as the light steering stage is essentially an analogue stage, it is very prone to errors. A system with closed loop driving can compensate those errors and make for a reliable and accurate image reproduction.

A light steering projector has the potential to extend the dynamic range both in black and in white without requiring much additional laser power and therefore without a significant increase in cost. However, the light steering modulator is an analogue component (for MEM's as well as phase modulators) and stability of the highlight illumination pattern is a major concern. A distortion in the position or amplitude of the highlight pattern will create significant image artefacts. The invention enables to mitigate those artefacts.

Additionally or alternatively, at least one image sensor can run at a multiple of the frame frequency of the input image, in order to provide sub-frame resolution.

Advantages are that frames acquired by the image sensor during frame n of the input image are available to any of the block diagrams during the display of frame n, and thus the feedback calculated or measured from the sensor image for frame n can be applied during frame n, or before the frame finishes or for the next frame n+1.

Additionally or alternatively, the projector can comprise a second amplitude modulator and the step of generating a target highlight image can comprise a target image and power control signals from the input image which can generate a target base image.

Additionally or alternatively, one of the at least one image sensor can comprise an addressable area and one of the at least one image sensor can comprise an active area, and the addressable area can be configured to provide real-time calibration patterns and the active area can be configured to provide periodic calibration patterns, and the step of generating the predicted backlight image from the target highlight image can further comprise as input, the real-time calibration patterns and the periodic calibration patterns.

This has the advantage of the system providing a more detailed image or output signal where the prediction is based on the actual implementation.

Advantageously, the addressable area is configured to generate calibration patterns which provide information on a background level.

Using the background level has the advantage of providing information on the steered component of the light beam but also compensating any drift in the opto-mechanics, the phase modulator and/or the laser source.

Additionally or alternatively, one of the at least one image sensor can comprise an active area, and the image sensor can be configured to acquire a real-time backlight image within the active area, said real-time illumination profile image comprising slowly varying content between frame n and n+1, and the step of generating a target highlight image, a target image and power control signals from the input image for frame n+1 further can use input from the slowly varying content from the real-time backlight image acquired during frame n of the input image.

This has the advantage of using the actual image of the previous frame.

Advantageously, motion detection means are configured to determine which part of the input image frame is static between two consecutive frames and which part is dynamic.

Advantageously, means to decide on a pixel or region basis which part of the image is static or slowly varying and which part of the image is dynamic are provided.

Advantageously, in regions or for the pixels of the input image where the content is static, the predicted illumination profile is compared to the actual illumination profile when the actual illumination profile is higher than the predicted illumination profile, the target image is attenuated by the ratio of the actual illumination profile to the predicted illumination profile, when the actual illumination profile is lower than the predicted illumination profile, but still sufficient, the target image is multiplied by the same ratio of the actual illumination profile to the predicted illumination profile, when the actual illumination profile is lower than the predicted illumination profile, and is too faint, the target highlight is increased to deliver sufficient brightness, while at the same time the target image is multiplied by the same ratio of the actual illumination profile to the predicted illumination profile.

This allows to apply the correction only to regions of the images which are static or have slowly varying content.

Additionally or alternatively, in the step of generating a target highlight image, a target image and power control signals from the input image from the input image for frame n can use input from the predicted backlight image.

Additionally or alternatively, the step of generating an amplitude pattern for driving the amplitude modulator for frame n+1 from the predicted backlight image and the target image can use as input the actual backlight image of the previous frame n or sub-frame when driven at a multiple frequency of the amplitude modulator. Additionally, when receiving the target base image, a base pattern can be generated.

This has the advantage of using the real signal to improve the final output.

Additionally or alternatively, a portion of the light can be processed by the phase modulator to generate a highlight image on the amplitude modulator and another portion of the light is uniformly distributed on the amplitude modulator to provide a base image.

This has the advantage of generating two types of illumination from light of the same light source.

Additionally or alternatively, the at least a portion of the illumination pattern substantially equivalent to the illumination pattern incident on the amplitude modulator is a scaled down version, optionally less than 1:1.

Preferably the image sensor is positioned in the path of those optical elements that generate the highlight.

Any discrepancy between the amplitude modulator image and the camera image is preferably mitigated by image processing.

The image sensor can be arranged to receive light from reflected light of an inserted glass plate, for example, rather than the image sensor being placed behind a folding mirror.

The camera can operate at a higher frame rate and sampling is at lower resolution when the camera is used to monitor laser safety.

A switch can be arranged to provide switching to a higher resolution to perform calibration.

In another embodiment of the present invention there is provided a method for monitoring the light levels provided by at least one laser source in a projector system, said at least one laser source being driven by power control signals, the projector system can comprise a phase modulator and at least one amplitude modulator, the phase modulator can be configured to generate a highlight image incident on the amplitude modulator, the projector system can comprise at least one image sensor configured to receive at least a portion of an illumination pattern substantially equivalent to the illumination pattern incident on the amplitude modulator, the image sensor can comprise at least one of an active area and an addressable area, the method can comprise the steps of comparing the light intensity within at least one of the active area and the addressable area with a threshold, reducing the power or shutting down the laser source with the power control signals when the measured light intensity is higher than the threshold.

This has the advantage of providing a system with safety means implemented in order to avoid exposing the audience to unsafe levels of laser light.

In another embodiment of the present invention there is provided a projector comprising: a phase modulator and at least one amplitude modulator, the phase modulator can be configured to generate a highlight image incident on the amplitude modulator, the projector can comprise at least one image sensor configured to receive at least a portion of an illumination pattern substantially equivalent to the illumination pattern incident on the amplitude modulator, the phase modulator, amplitude modulator and image sensor being controlled by a driver, whereby the projector can further comprise a feedback loop for providing the output of the image sensor to the driver.

Additionally or alternatively, the phase modulator and the amplitude modulator can be arranged on an optical path; the phase modulator steering a light beam to an intermediate image, said image sensor and amplitude modulator can receive light from said intermediate image such that the optical path between said image sensor and intermediate image can be (e.g. substantially) optically equivalent to the optical path between the spatial light amplitude modulator and the intermediate image. Additionally, the steered light beam can be steered to an active area and to a non-active area of the image sensor. Additionally, the steered light beam can provide calibration patterns to the non-active area. Additionally, the intermediate image can be on a diffuser or on a moving diffuser.

Additionally or alternatively, a portion of the light can be processed by the phase modulator to generate a highlight image on the amplitude modulator and another portion of the light is uniformly distributed on the amplitude modulator to provide a base image.

Additionally or alternatively, the projector can comprise a second amplitude modulator configured to generate a base pattern for the second amplitude modulator.

Additionally or alternatively, said spatial light amplitude modulator can comprise at least one of a reflective spatial light amplitude modulator, and a transmissive spatial light amplitude modulator. Additionally, said spatial light amplitude modulator can comprise one of a liquid crystal device, a plurality of micro-mirrors.

Additionally or alternatively, the phase modulator can comprise one of a deformable mirror, MEMS, an LCoS device.

Advantageously, the image sensor is a CMOS sensor or a CCD sensor.

Such sensors can be driven at a sub-frame of the amplitude modulator or of the image sensor.

Additionally, the illumination brightness levels can be 0-50% higher than the target image brightness level.

The at least a portion of the illumination pattern substantially equivalent to the illumination pattern incident on the amplitude modulator is a scaled down version, e.g. the scaled down version can be less than 1:1. This has the advantage of using a smaller and cheaper sensor.

The image sensor can be positioned in the path of those optical elements that generate the highlight.

Any discrepancy between the amplitude modulator image and the camera image can be mitigated by means of image processing.

The image sensor can be arranged to receive light reflected from an inserted glass plate rather than the image sensor being placed behind a folding mirror.

The camera can be operated at a higher frame rate and sampling is at lower resolution when the camera is used to monitor laser safety.

A switch can be arranged to provide switching to a higher resolution at a lower framerate to perform calibration.

In another embodiment of the present invention there is provided a computer program product comprising software which executed on one or more processing engines, can perform any of the above-mentioned methods. Additionally, the computer program product can be stored on a non-transitory signal storage medium. Additionally, there is provided a controller for a projector system according to the present invention.

The technical effects and advantages of embodiments of according to the present invention correspond mutatis mutandis to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which.

DETAILED DESCRIPTION OF THE INVENTION

Figure 1:
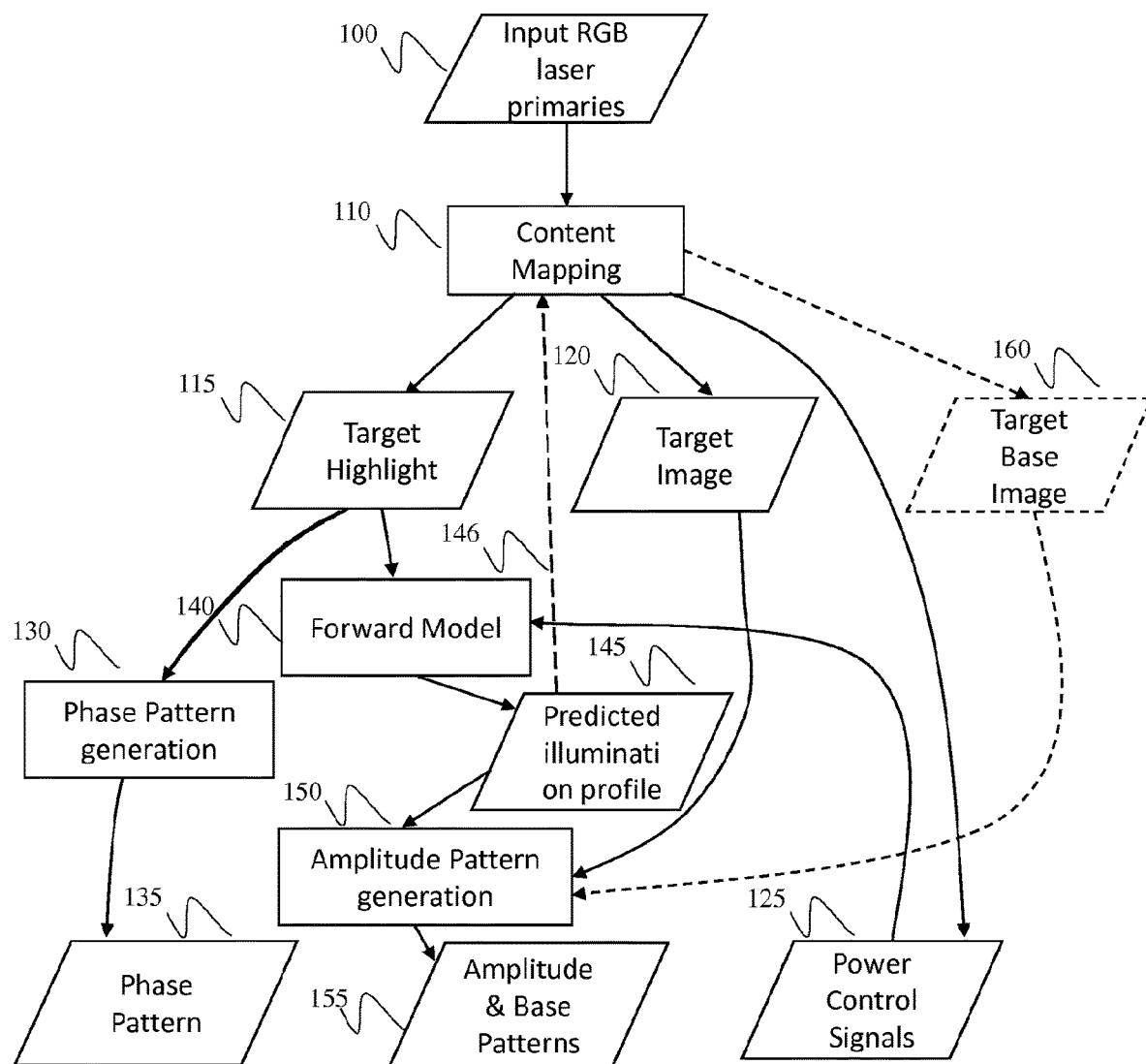
FIG. 1 illustrates a flow diagram to generate the phase pattern, the amplitude and the power control signal from an input image.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The terms "about" or "approximate" and the like are synonymous and are used to indicate that the value modified by the term has an understood range associated with it, where the range can be +20%, +15%, +10%, +5%, or +1% or alternatively ±20%, ±15%, ±10%, ±5%, or ±1% The term "substantially" is used to indicate that a result (e.g., measurement value) is close to a targeted value, where close can mean, for example, the result is within 80% of the value, within 90% of the value, within 95% of the value, or within 99% of the value.

Definitions

Target Base Image: In cases where the system uses a Dual Projector setup, the Target Base Image is the image to be reproduced by the Base projector. This signal is not used in a Highlighter projector only or Hybrid projector setup.

Target Image: This is the final image to be reproduced by the Highlighter projector or the Hybrid projector. In case of a dual projector setup, the Target Image is considered to be the part of the Image without the Target Base Image.

Highlight image: The highlight image is the image created by the phase modulator incident on the amplitude modulator. The highlight image can be seen as a detailed caustic image, which increases the brightness of the final image.

Illumination profile image: The illumination profile image is the equivalent of the highlight image with the optional addition of base illumination in the case of a Hybrid projector Predicted illumination profile or Predicted Highlight: The predicted illumination profile corresponds to the simulated illumination profile present at the second, amplitude modulator.

Target highlight or Target Illumination profile: The ideal illumination pattern to be created by the phase modulator incident on the amplitude modulator, assuming the phase modulator is illuminated by a perfectly collimated laser beam, there are no optical distortions and no parasitic reflections by the phase modulator and the diffuser is perfectly positioned in the intermediate image plane.

Phase modulator: A phase modulator is a device which introduces phase variations on an incident wavefront. In the context of the invention, it creates a smooth and low detail image on the amplitude modulator. Different technologies can be used to provide a phase modulator. These technologies include microelectromechanical (MEMS) displays, which provide a very fast temporal response but a low spatial resolution. Deformable mirrors as used for example in the field of adaptive optics can also be used. LCD displays can also be used, which include liquid crystal on silicon (LCoS) devices, which have the advantage of offering a high spatial resolution, high speed and a high pixel fill factor. Liquid crystal displays used in transmission can also be used.

Base projector: A base projector is a traditional projector with uniform illumination which comprises an amplitude modulator per color. A single amplitude modulator may be used with a sequence of coloured parts of an image. Alternatively, three amplitude modulators are used in parallel, one for each colour.

Highlighter projector: A highlighter projector is a projector which comprises a dual modulation design which combines a phase modulator and an amplitude modulator per color.

Hybrid projector: A hybrid projector is a projector which combines the functionality of a Highlighter projector and a Base projector, while using only one amplitude modulator per color. A portion of the light is processed by the phase modulator to generate a highlight illumination onto the amplitude modulator, another portion of the light is uniformly distributed onto the amplitude modulator.

Dual Projector setup: A setup that combines a Base Projector and a Highlighter projector to create a combined image. The image can be combined onto the screen or the optical paths can be combined into a single projection lens. We will use the term Dual projector setup when the base image and the highlight image are each processed by a separate amplitude modulator.

Tone mapping: A method to compress or expand the dynamic range of the input signal such that it fits within the dynamic range of the projector.

Reference numbers and functional blocks: FIGS. 1, 6, 7, 11 and 12 show work flows disclosed as linked functional blocks. Reference numbers associated with these blocks are disclosed below in table 1 as well as text parts of the description that provide additional information with respect to each reference number:

TABLE 1

| Block | Definition FIGS. 1, 6, 7, 11, 12 |
| --- | --- |
| 100 | Input RGB laser primaries |
| 110 | Mapping block (FIG. 1, 6) Content mapping (FIG. 7, 11, 12) Text: "content mapping block" The content mapping block 110 is responsible to determine the split between a Target Highlight 115, a Target Image 120, and optionally for a dual projector a Target Base Image 160 as well as Power Control Signals 125 The content mapping block 110 is also responsible for remapping content that is unfeasible given the system power budget and imaging parameters. The content mapping block 110 thus generates the target Highlight 115, the target image 120 and optionally the Target Base Image 160. |
| 115 | Target highlight (FIG. 1, 7, 11, 12) Target illumination profile (FIG. 2) Text: "target highlight or target illumination profile" The target highlight represents the illumination pattern that should be created by the phase modulator onto the surface of the amplitude modulator The target highlight 115 is also used as input to the forward model processing block 140. |
| 120 | Target image: Target Image 120 represents the final image after modulation of the illumination pattern by the amplitude modulator. |
| 125 | Power control signals: The overall laser power required, which results in a signal that can be used for real-time power modulation of the RGB laser light sources. The use of such a signal is optional |
| 130 | Phase pattern generation: The output of the phase pattern generation algorithm block 130 is a phase pattern 135 which corresponds to the drive parameters needed to effect light-redistribution by the phase modulator. |
| 135 | Phase pattern: a phase pattern 135 which corresponds to the drive parameters needed to effect light-redistribution by the phase modulator. |
| 140 | Forward model: the forward model processing block 140 generates a predicted illumination profile image which is further used to calculate the amplitude and base patterns. Profile The predicted illumination profile image can be generated with system calibration data to have a better prediction of the actual illumination profile illumination pattern. It can also be generated with simulations, although many effects would not be accounted for as they would have to be modelled. the Forward Model block 140, can now consider multiple calibration inputs. |
| 145 | Predicted illumination profile image: The predicted illumination profile image 145 in combination with the target image 120, is used as input to the Amplitude Pattern Generation Block 150 to determine the necessary amplitude signal to drive the second modulator, the amplitude modulator of the highlighter projector or the hybrid projector i.e. the Amplitude Patterns 155. Optionally, the predicted illumination profile 145 from the forward model block 140 is used as a feedback signal to the content mapping block 110, illustrated with arrow 146 in the flow diagram. This enables to verify if the predicted illumination profile brightness effectively exceeds the target image brightness, such that with the proper amplitude signal to the second modulator this target image brightness can effectively be achieved. Where this is not the case, the content mapping block could then increase the target highlight image and/or the laser power control signal. |
| 150 | Amplitude pattern generation: The predicted illumination profile image 145 in combination with the target image 120, is used as input to the Amplitude Pattern Generation Block 150 to determine the necessary amplitude signal to drive the second modulator, the amplitude modulator of the highlighter projector or the hybrid projector i.e. the Amplitude Patterns 155. |
| 155 | Amplitude & Base patterns: The amplitude pattern for driving the amplitude modulator from the predicted illumination profile image and the target image. In cases where there is also a base projector, the amplitude pattern generation also creates a Base Pattern. If the base illumination would be perfectly uniform, the Base Pattern could |

TABLE 1-continued

Figure 3:
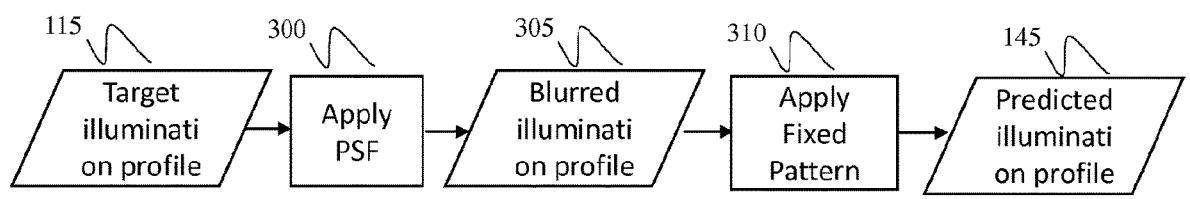
FIG. 3 shows the flow diagram to generate the predicted illumination profile with the calibration image.

| Block | Definition FIGS. 1, 6, 7, 11, 12 |
|---|---|
| | be identical to the Target Base Image. But when the base illumination uniformity is not perfect, color and brightness uniformity correction could be applied to derive the Base Pattern from the Target Base Image. |
| 160 | Target base image: represents the image to be created by the base projector for a dual type projector setup. |
| 300 | Apply PSF: The PSF 300 and Fixed Pattern 310 applied are now provided with periodic calibration images acquired with the image sensor 7. |
| 305 | Blurred illumination profile |
| 310 | Apply fixed pattern: The Fixed Pattern 310 applied are provided with periodic calibration images acquired with the image sensor 7. |
| 220, FIGS. 6, 12 | Sensor Image Outside Active Area: The information captured with the image sensor 7 outside of the active area, i.e. in the addressable areas 16, 17, during operation can be used to verify the stability of the PSF in size and position as well as the stability of the unsteered light component. |
| 230, FIGS. 6, 12 | Real Time and Daily Calibration Data: The daily auto-calibration cycle allows compensating for any drift in the PSF size or position or in the intensity balance between the RGB laser sources. It can be advantageous that the daily calibration data which now contains proper compensation for the second modulator optics behavior is used to deliver the predicted illumination profile pattern 145, using the flow diagram of FIG. 3. |
| 240, FIGS. 7, 11, 12 | Sensor Image Inside Active Area: the image captured by the image sensor 7 in the active area (the actual illumination profile image) is taken as input to the Content Mapping block 110. |
| 250, FIGS. 7, 11, 12 | Actual illumination profile image: In portions of the image where the content is static (input image for the current image frame is substantially identical or identical to the previous image frame), the predicted illumination profile is compared to the actual illumination profile |

DESCRIPTION OF THE ILLUSTRATIVE EMBODIMENTS

One aspect of the present invention is a dual modulation projection system providing a highlight image. This dual modulation projection system can further be combined with a base projector to form a dual projector. Alternatively, in a hybrid projector the highlight image and the base image are combined at the level of an amplitude modulator. Embodiments of the present invention are described first for a highlighter projector and the combination with a base projector, as a dual projector is illustrated in the flow diagrams with dotted lines.

Collimated laser light is received by a phase modulator. Light leaving the phase modulator for a given channel can be combined with light from the remaining channels and relayed through a diffuser to a prism structure such as a Phillips prism. The Phillips prism splits the light into its component colours which are each modulated by a spatial amplitude modulator (such as a DMD or LCOS) mounted to the prism, recombined within the prism and directed to a projection lens. The phase modulator introduces phase variations to the incident wavefront. The aim of the phase modulator is to redistribute light, reallocate light, from the input illumination to a target illumination profile (or target highlight), so as to produce both a higher dynamic range as well as an improved local peak luminance, compared to traditional projectors. This redistributes light from dark areas to bright regions creating highlights. This results in using available light economically. The target highlight is chosen ideally to approximate an upper envelope of intensities from the target image.

Although the phase modulator steers the incoming wavefront to redistribute the light on the amplitude modulator, there is always a fraction of the light which remains unsteered and which ends up in the projected image, in the form of a background image, even if all the light is steered outside of the active area. This in a first approximation can be modelled as a DC component added to the steered fraction of the light. This DC component of unsteered light is a problem as it reduces the contrast ratio of the projector.

The phase modulator further introduces a number of artefacts such as a fixed texture, diffraction artefacts, and the DC component of the unsteered illumination.

It is advisable to incorporate a diffuser in the design of the highlighter projector that is positioned in an intermediate image. Preferably this diffuser is a moving diffuser. The primary purpose of the diffuser is to introduce angular diversity for despeckling purposes and to widen the beam coming out of the projection lens for laser safety.

By positioning this (optionally moving) diffuser out of the intermediate image plane such that the relayed image from the diffuser onto the spatial amplitude modulator such as a DMD is not a sharp image, it can also be used to provide a smoothing effect by spatially averaging the image.

Aspects of the present invention can be used with any type of projector or projector system comprising light steering capabilities. Thus, aspects of the present invention include a two-projector system consisting of a base projector and a highlighter projector or a hybrid projector with a base projector and a highlighter projector integrated in one projector. The highlighter projector can be a dual phase/amplitude modulation projector.

FIG. 1 shows a flow diagram to illustrate the steps required to control a highlighter type projector (and a dual projector or hybrid projector system), and to generate, from an input image expressed in RGB laser primaries, a phase pattern, amplitude pattern(s) and power control signal(s) for the light source. Each rectangular block corresponds to a set of operations, parallelograms indicate input and output operations. The set of operations within each box can be executed by a computer program product. These set of operations or algorithms can be run on a projector controller, e.g. having a processing engine such as a microprocessor or an ASIC or an FPGA or similar. Solid arrows indicate required interactions between blocks while dashed arrows indicate optional interactions between blocks. Solid blocks are required for every configuration, dashed blocks are required only for the dual projector setup.

The input to the method is an input image expressed in linear RGB laser primaries 100, which has been derived from an input image after color transformation and linearization. However, the invention is not limited thereto and other types of input images can be provided, for example if different types of light sources are being used.

This image 100 is an input to a content mapping block 110 responsible to determine the split between a Target Highlight 115, a Target Image 120, and optionally for a dual projector a Target Base Image 160 as well as Power Control Signals 125. The Target Highlight 115 represents the illumination pattern that should be created by the phase modulator onto the surface of the amplitude modulator and the Target Image 120 represents the final image after modulation of the illumination pattern by the amplitude modulator. The Target Base Image 160 represents the image to be created by the base projector for a dual type projector setup.

The content mapping block 110 is also responsible for remapping content that is unfeasible given the system power budget and imaging parameters. The algorithm can for example first verify if the input image 100 is feasible given the system power budget. The content mapping block 110 thus generates the target Highlight 115, the target image 120 and optionally the Target Base Image 160.

Thus, in the content mapping block the input image 100 is processed to determine:

1. The target image 120. When the input image 100 is within the capabilities of the system, the target image will be identical to the input image 100. If the input image 100 exceeds the capabilities of the system (for example because the peak brightness exceeds its capabilities or the average brightness exceeds its capabilities) the image 100 will be tone mapped to an adjusted target image that falls within the capabilities of the system.
2. The power control signal(s) 125. The overall laser power required, which results in a signal that can be used for real-time power modulation of the RGB laser light sources. The use of such a signal is optional, it is also possible to run the lasers at full power all the time and either distribute all the light over the image, or send some of the excess light outside of the active image area (e.g. into a beam dump). In the case of a dual projector setup or a hybrid projector, there will be a separate base light source that can also be modulated in real-time. Using those two signals both the base illumination strength and the strength of the illumination distributed over the highlights can be controlled in real-time to match the requirements of the image. Not only can this reduce the overall power consumption, but it can also be used to optimize contrast.
3. The target Highlight 115. The distribution of this laser power in a low-resolution illumination pattern. One condition of this target highlight Image is that it provides for every pixel, in every color, a brightness level that exceeds the target image 120. The target highlight image can be the same for the three colors (white image) or different for the three colors.
4. The Target Base Image 160.

To form the Target Image 120, i.e. the image generated by the phase modulator at the level of the amplitude modulator, the target highlight 115 is used as an input to a phase pattern generation algorithm block. Algorithms such as the one described in *Damberg and Gregson, ACM,* 2016 can be used for the calculation of the phase pattern. However, the invention is not limited thereto and the skilled person will appreciate that other methods are also suitable therefore. The output of the phase pattern generation algorithm block 130 is a phase pattern 135 which corresponds to the drive parameters needed to effect light-redistribution by the phase modulator. In an ideal world, when this phase pattern is applied to the phase modulator, it would yield an illumination profile illumination pattern that is exactly the same as the target highlight 115. However, for all the reasons listed above, it will not be the case.

The target highlight 115 is also used as input to the forward model processing block 140. As described in *Damberg and Gregson, ACM,* 2016, the algorithm also makes use of the forward image formation model from simulations to predict the illumination profile present at the second, amplitude-only modulator. The forward image formation model corresponds to the Forward model block in the flow diagram of FIG. 1.

Thus, the forward model processing block 140 generates a predicted illumination profile image which is further used to calculate the amplitude and base patterns.

The predicted illumination profile image can be generated with system calibration data to have a better prediction of the actual illumination profile illumination pattern. It can also be generated with simulations, although many effects would not be accounted for as they would have to be modelled.

Figure 2:
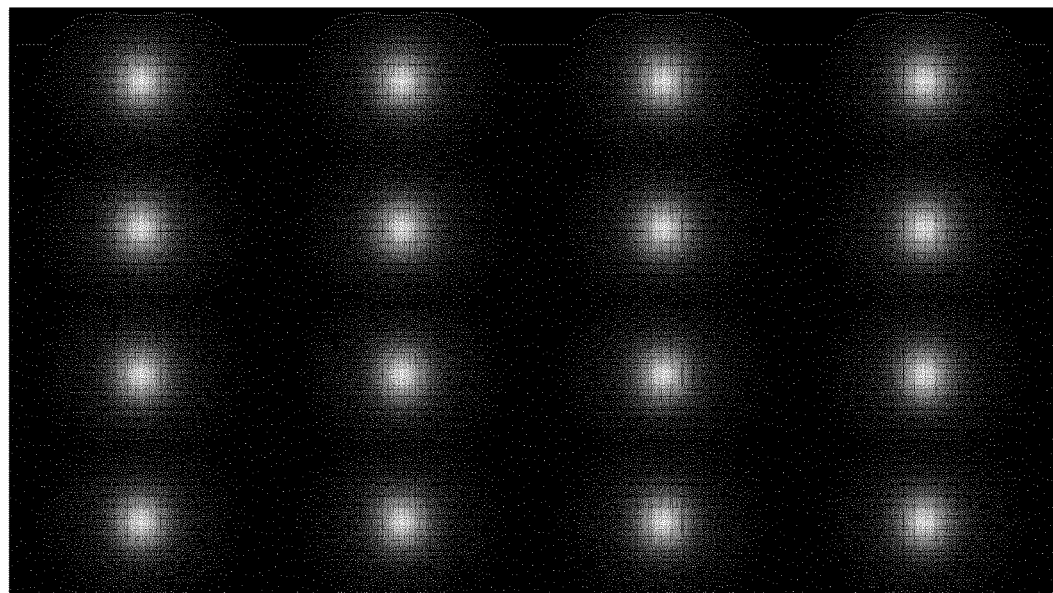
FIG. 2 shows a calibration image.

The system calibration data can be captured by an external camera during a one-time calibration procedure, and characterizes how a small spot of light is blurred by the imperfect beam quality of the lasers and by the optical system parameters. The so-called Point Spread Function (PSF) can be characterized for the different colors (lasers) and at different positions. An example of PSF captured for different colors at different positions is shown in FIG. 2. A second part of the calibration is capturing an image of the so-called unsteered light, which in a first approximation is a fixed pattern of illumination. The predicted illumination profile image (145 in FIG. 3) is based on a blurred version of the target highlight image (305) summed with the fixed pattern (310) of the unsteered light, as illustrated in the block diagram of FIG. 3.

The forward model block also receives the power control signals. The predicted illumination profile image is multiplied with the power control signal for the highlight laser source. In case of a hybrid projector, also a prediction of the base illumination can be made, since this is a fixed, mostly uniform illumination, the pattern can be easily captured during calibration, and this pattern, multiplied with the power control signal for the base light source can be added to the predicted illumination profile image.

The predicted illumination profile image 145 (the predicted illumination profile is analogous to the brightness profile generated by an LCD backlight using an LED matrix with local dimming capability) in combination with the target image 120, is used as input to the Amplitude Pattern Generation Block 150 to determine the necessary amplitude signal to drive the second modulator, the amplitude modulator of the highlighter projector or the hybrid projector i.e. the Amplitude Patterns 155. In cases where there is also a base projector, the amplitude pattern generation also creates a Base Pattern. If the base illumination would be perfectly uniform, the Base Pattern could be identical to the Target Base Image. But when the base illumination uniformity is not perfect, color and brightness uniformity correction could be applied to derive the Base Pattern from the Target Base Image.

Optionally, the predicted illumination profile 145 from the forward model block 140 is used as a feedback signal to the content mapping block 110, illustrated with arrow 146 in the flow diagram. This enables to verify if the predicted illumination profile brightness effectively exceeds the target image brightness, such that with the proper amplitude signal to the second modulator this target image brightness can effectively be achieved. Where this is not the case, the content mapping block could then increase the target highlight image and/or the laser power control signal.

One of the aspects of the present invention is a refinement of the one-time calibration with a feedback, e.g. intermittent or continuous feedback mechanism for a projector. To implement such an intermittent or continuous feedback mechanism, an image sensor is provided e.g. is integrated within the projector's optical path or can be brought into the optical path. The image sensor receives an image (or a fraction of the image) of the illumination pattern that is equivalent to the illumination pattern that is incident on the amplitude modulator. The illumination pattern can be related to or adapted to an image such as a video to be projected. Such an image or video is projected as frames.

The image sensor can be driven at the same frequency as the amplitude modulator or the input image or at a multiple of the frequency of the amplitude modulator or the input image. Driving the image sensor at a higher speed has the advantage increasing the speed of the feedback loop.

The image sensor, the phase modulator and the at least one amplitude modulator can be driven by the projector controller. The projector controller can further also drive the light source, i.e. laser sources.

The images of the image sensor are analyzed by means of image analysis software or digital image processing techniques known in the art to retrieve the required information from the images and provide said information as feedback to the controller configured to execute the feedback loop according to the present invention.

The intermittent or continuous feedback could be implemented at any level of the flow diagram of FIG. 1 wherein the image of the illumination pattern acquired by the image sensor can improve the driving scheme of the projector, thus at different levels, as further explained, e.g. any of:
1. A feedback mechanism for fine tuning of parameters of the forward predictive model, i.e. as a refinement of the one-time calibration of the forward model 140.
2. A near real-time feedback mechanism to correct a target brightness in the next frame for semi-static content.
3. A real-time feedback mechanism to adjust the drive signal of the amplitude modulator.
4. A hybrid combination of the previous methods. For example, two or more of these methods 1 to 3 or a combination of all three of methods 1 to 3.

The image sensor could for example be integrated in the projector's optics behind a highly reflective dichroic folding mirror. This dichroic folding mirror could be specified to reflect 99% till 99.5% of the light. The 1% respectively 0.5% of the light leaking through the mirror would be sufficient to be forwarded to and received by the image sensor. The optical path of the image sensor, has characteristics which preferably resemble as closely as possible to the characteristics of the optical path towards the second spatial amplitude modulator, or in other words, the optical path of the image sensor is substantially optically equivalent (such that it has identical (or nearly identical) optical characteristics) to the optical path of the second spatial amplitude modulator. For example, if the second spatial amplitude modulator is a reflective spatial modulator such as a DMD device, the reflective spatial amplitude modulator such as a DMD is typically at an angle with respect to the optical axis of the incoming beam. In this case it is preferred that also the image sensor is at a similar angle with respect to the optical axis. A spatial amplitude modulator such as a DMD optical system typically uses a TIR prism, where the shape of the prism is optimized to minimize the path length differences incurred by putting the spatial amplitude modulator such as a DMD at an angle with respect to the optical axis. A dummy prism can be introduced in the light path towards the image sensor to create a similar situation. If the image sensor is of a different size than the reflective spatial modulator such as the DMD device the magnification of the imaging optics towards the sensor is preferably different than the magnification of the imaging optics towards the spatial amplitude modulator such as the DMD.

Alternatively, to optically try to replicate the characteristics of the optical path from the intermediate image to the second spatial amplitude modulator, such as a DMD, it would be possible to design the image sensing optics to only capture the intermediate image and apply an electronic correction to take into account the geometric distortion and blurring caused by the rotation of the second spatial amplitude modulator versus the optical axis.

Alternatively or additionally, the image of the spatial amplitude modulator such as a DMD can be a scaled down version. This can be less than 1:1 as this provides the advantage of a reduced cost of the image sensor.

Alternatively or additionally, the image sensor can be positioned in the path of those optical elements that generate the highlight. This may provide the advantage of a better utilization of available space. In case where there is a base illumination added to the highlight illumination, this base illumination is characterized in a calibration step and is considered to be constant over time.

Alternatively or additionally, any discrepancy between the amplitude modulator image, e.g. the DMD image and camera image can be mitigated by means of image processing such as for example image warping, flat field correction and/or location dependent blurring. In this case, such image processing may add a delay and true closed loop driving may no longer be possible. Even so the image sensor with image processing can still be used for calibration, static image feedback or for laser safety detection.

Alternatively or additionally, the image sensor can receive light from reflected light of an inserted glass plate rather than the image sensor being placed behind a folding mirror. This may provide the advantage of a better utilization of available space.

Alternatively or additionally, the camera can be at a high frame rate (e.g. 1400 Hz). Sampling can be at low resolution (e.g. 40×21) for example when the camera is used to monitor laser safety. A switch to a higher resolution at lower framerate can be provided to perform calibration, e.g. whenever time allows when the projector is not used and the amplitude modulator can be set to black, such as the time between the finish of one movie and the start of another.

It is important to note that the feature of providing substantially optically equivalent characteristics can be provided optically but also electronically. It is possible to have imperfect optical equivalence being corrected electronically. What is required is that the intermediate image is relayed onto both the second modulator and onto the sensor whereby most of the light ends up on the second modulator and only a very small part onto the sensor.

The resolution of the image in the intermediate image plane (in the plane of the phase modulator) is very limited. The point spread function will span hundreds to several hundreds of pixels on the second modulator (amplitude modulator). The image sensor can therefore capture the image with a resolution well below the native resolution of the second modulator, as the low-resolution image from the sensor, can be up-sampled with good accuracy.

Figure 4:
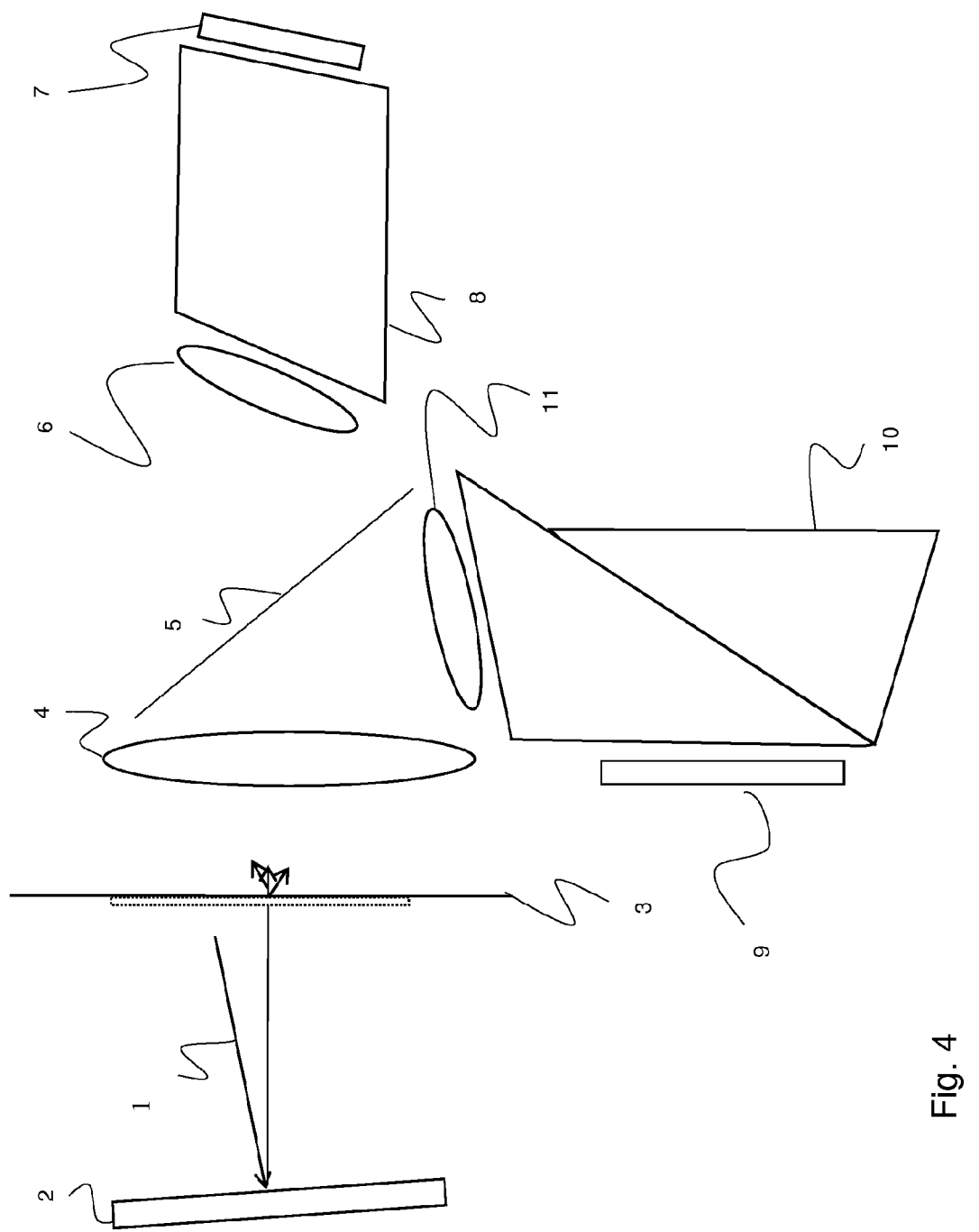
FIG. 4 shows an optical layout of a projector according to embodiments of the present invention.

FIG. 4 is a schematic representation of part of the optical path of a highlighter projector in accordance with an embodiment of the present invention. A light source such as a laser light source (not shown) provides a beam 1 which is incident on a phase modulator 2. In the present embodiment, the phase modulator 2 is a reflective phase modulator but it could be a transmissive phase modulator. Illumination and sensing imaging optics 4 are provided along the optical path after the diffuser 3. A mirror 5 reflects the intermediate image onto a prism structure 10, after Illumination imaging optics means 11. From the amplitude modulator 9 via prism structure 10 the final image is projected through a projection lens (not shown). A small amount of light also passes through the mirror 5 and falls onto sensing and imaging optics 6, a dummy prism 8 and onto an image sensor 7. The small amount of light for example can be provided by the mirror 5 being half-silvered.

For embodiments comprising a dual type projector, i.e. a highlighter and a base projector, the images generated by both projectors are superposed on the projection screen. For embodiments comprising a hybrid type projector, the beams of the highlighter and of the base are superposed upstream of the amplitude modulator 9, for each color.

The various embodiments of aspects of the present invention are hereby described.

1. Feedback Mechanism for Fine Tuning the Parameters of the Forward Model 140.

The maximum steer angle from the phase modulator 2 (or in fact from any such MEM's device) will typically be identical in horizontal and vertical directions. When the final image is wider than it is high (as is typically the case in modern 16:9 aspect ratio displays or cinema formats), and if the system is designed such that light can be steered by the phase modulator across the full width of the intermediate image 3 but beyond the active area representing that part of the intermediate image 3 that is for display, there is a possibility to steer the light beyond the top and bottom edges of the active area, e.g. beyond the edges of the active area on the intermediate image 3 which represents beyond the height of the image to be displayed.

Figure 5:
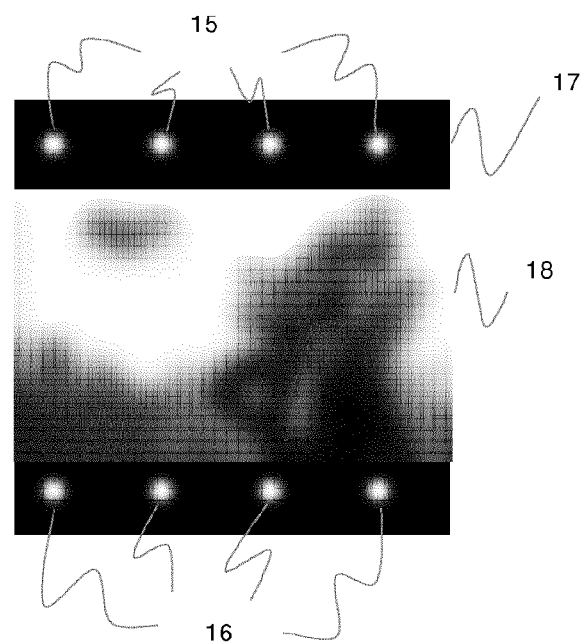
FIG. 5 shows a sensor image acquired during operation of the projector according to embodiments of the present invention.

This addressable area 17, beyond the active area 18 can be used to generate calibration patterns (as shown in FIG. 5 as upper and/or lower calibration patterns, 15, 16 respectively) in the factory or during normal operation of the projector. This would allow an intermittent or continuous refinement of the Forward Model 140, compensating any drift in the opto-mechanics, the phase modulator and/or the laser source.

The level in the background of the calibration patterns can be used as an indicator for the amount of unsteered light. This information can then also be coupled back to the Forward Model 140, and be used to calculate the next predicted illumination profile in cases where the content is predominantly static.

Additional laser energy will be required to create those calibration patterns outside the active area, but the calibration can be activated only if and when the image content does not require all the available laser energy. In this case, and if the laser source does not accommodate fast dimming, steering outside the active area might be the only solution to dump the excess light.

In this embodiment, the optical path and mechanics have to be designed to image the parts of the phase modulator, which correspond to the entire addressable area on the image sensor, on the moving diffuser and from the moving diffuser onto the image sensor. In the imaging path towards the amplitude modulator however it would be preferred to block the light outside the active area (e.g. with a cooled aperture), before it reaches the position of amplitude modulator and could cause undesirable heating and straylight.

The image sensor can be a full color sensor (e.g. with Bayer filter) or a monochrome sensor. In the latter case the test patterns for calibration can be presented sequentially per primary color.

In the present embodiment, a calibration procedure using the active area 18 can be executed during startup or shutdown of the projector, or more generally when there is no need for image formation on the projection screen. This calibration is referred to as daily calibration (although it can also be performed only when required by the system or on a periodic basis).

A calibration data using the addressable areas 15 and 16 can be performed during projection, or in real time.

Figure 6:
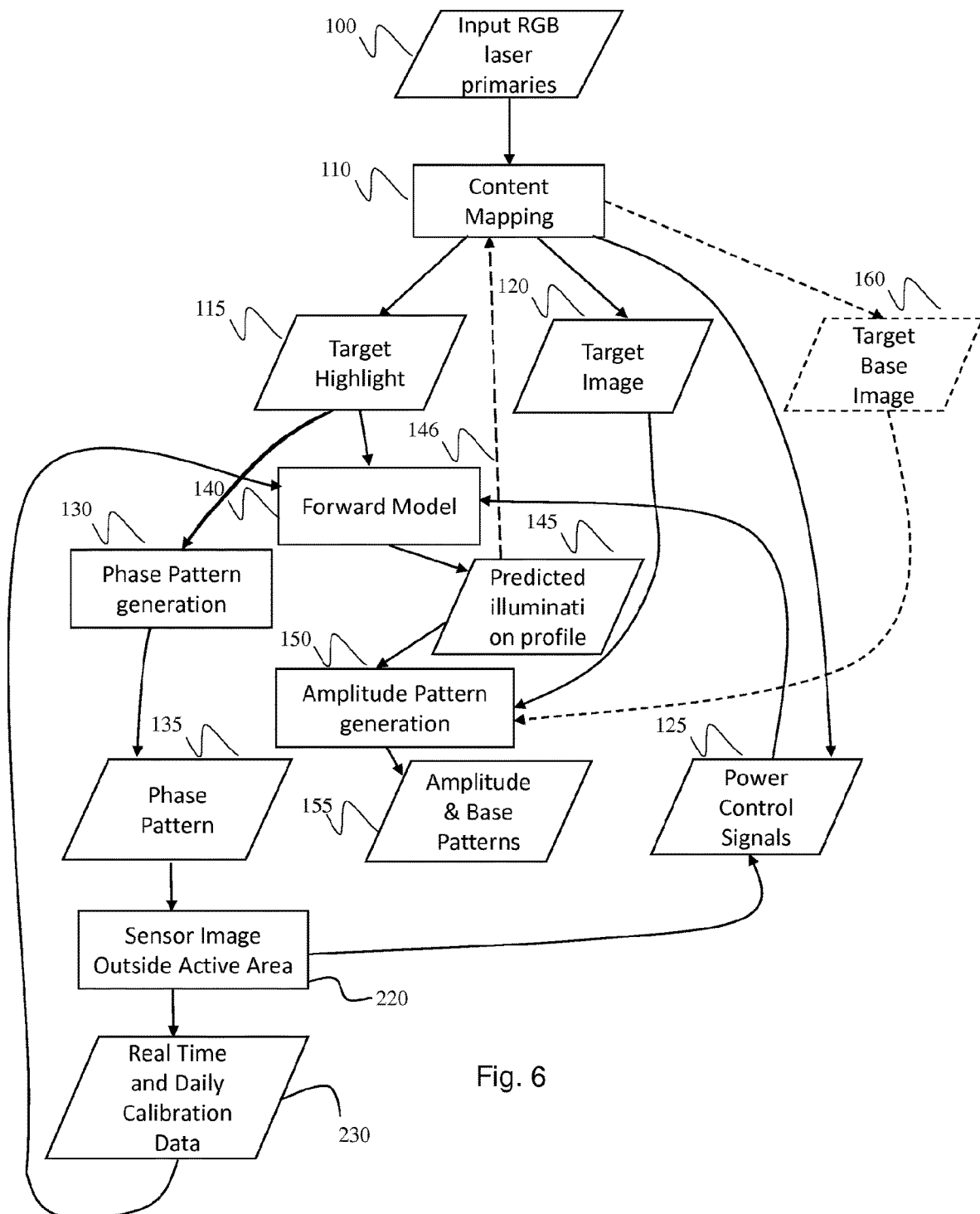
FIG. 6 shows a flow diagram with a feedback loop with real time calibrations according to an embodiment of the present invention.

The flow diagram in FIG. 6 has functional blocks—see table 1. As illustrated in the flow diagram of FIG. 6, the Forward Model block 140, can now consider multiple calibration inputs:

The one-time calibration data captured from the projection screen with an external camera upon setup, giving the actual on-screen PSF data from multiple colors at multiple locations and the brightness profile from the unsteered light, as described previously. Optionally it also gives the illumination profile of the base illumination in case of a dual projector setup or hybrid projector.

The same information captured with the internal image sensor 7 at startup or shutdown of the projector. At the time of the one-time calibration a relationship between this signal and the signal from the external sensor is established, to characterize how the optical system at the second modulator stage introduces some additional blurring of the PSF and some attenuation of the corner intensity by optical vignetting. The daily auto-calibration cycle allows compensating for any drift in the PSF size or position or in the intensity balance between the RGB laser sources. It can be advantageous that the daily calibration data which now contains proper compensation for the second modulator optics behavior is used to deliver the predicted illumination profile pattern 145, using the flow diagram of FIG. 3. Thus, in the flow diagram of FIG. 3, the PSF 300 and Fixed Pattern 310 applied are now provided with periodic calibration images acquired with the image sensor 7.

The information captured with the image sensor 7 outside of the active area (Sensor Image 220 Outside Active Area), i.e. in the addressable areas 16, 17, during operation can be used to verify the stability of the PSF in size and position as well as the stability of the unsteered light component. Variation in the intensity of the unsteered light component outside the active area is used as a multiplication factor to the daily captured unsteered light component. A systematic change in the PSF width or position (e.g. one color shows a systematic right shift of the PSF pattern relative to other colors, or a systematically wider PSF) will result in a correction on the daily captured PSF information in the active area (e.g. by applying the appropriate shift on the captured daily PSF data and appropriate additional blurring). Thus, the real-time calibration data acquired with the image sensor is used to update the daily calibration data 230 acquired with the image sensor 7.

The power control signals, as already described above.

The forward model thus now further receives (near) real-time calibration data from the internal image sensor 7 and can generate a more accurate predicted illumination profile 145 where slow and medium speed drift of the system parameter can be mitigated.

In another embodiment according to the present invention, the sensor can also be used to safeguard the maximum light level in the highlights in order to guarantee the light levels in front of the projection lens stay within the required limits to avoid exposing the audience to unsafe levels of laser light. What levels of highlights could be tolerated will be dependent upon the installation (such as the type of projection lens used, the position where the audience can interfere with the projected light beam . . . ). The maximum light level will therefore need to be calibrated upon installation of the projector. Thus, a threshold can be established during the calibration upon installation of the projector for example. The content mapping block will already tone map the content to stay below the set limit. However, the sensor could provide a second safeguard system in case something goes wrong in the algorithm such that too much light is concentrated in a certain location.

If the sensor detects brightness levels exceeding the set limit or the threshold, it will turn down or fully shutdown the laser source(s) via the power control signals.

2. A Near Real-Time Feedback Mechanism to Correct the Target Brightness in the Next Frame for Semi-Static Content.

In a second embodiment according to the present invention, the image (Sensor Image 240 Inside Active Area) captured by the image sensor 7 in the active area (the actual illumination profile image 250) is taken as input to the Content Mapping block 110.

For static and slowly varying content, the brightness levels of the images will vary slowly, and it can thus be assumed that the brightness levels in two successive frames will be substantially identical. It can thus be beneficial to correct the brightness error made in the target highlight for frame n (current frame for example) by adapting the brightness level of the target highlight used for frame n+1 (following frame). A ratio between the predicted illumination profile brightness level and the actual measured illumination profile brightness level (from the actual illumination profile image, which can be processed to be linearized and normalized) is made and used as a multiplication factor for the static content in the next frame n+1 of the illumination profile. A new drive signal for the first modulator will then be calculated to try to achieve the corrected target brightness level in the illumination profile. This new input to the Content Mapping block 110 can also be used to calculate the Target Image in the next frame and on the Power control signals for the next frame.

A motion detection mechanism can further be used to determine which part of the image frame is static and which part is dynamic and decide, on a per pixel basis or region basis, if the original image or the corrected image will be used. A weighted average between the two inputs can be used to obtain soft rather than hard transitions between adjacent pixels.

Figure 7:
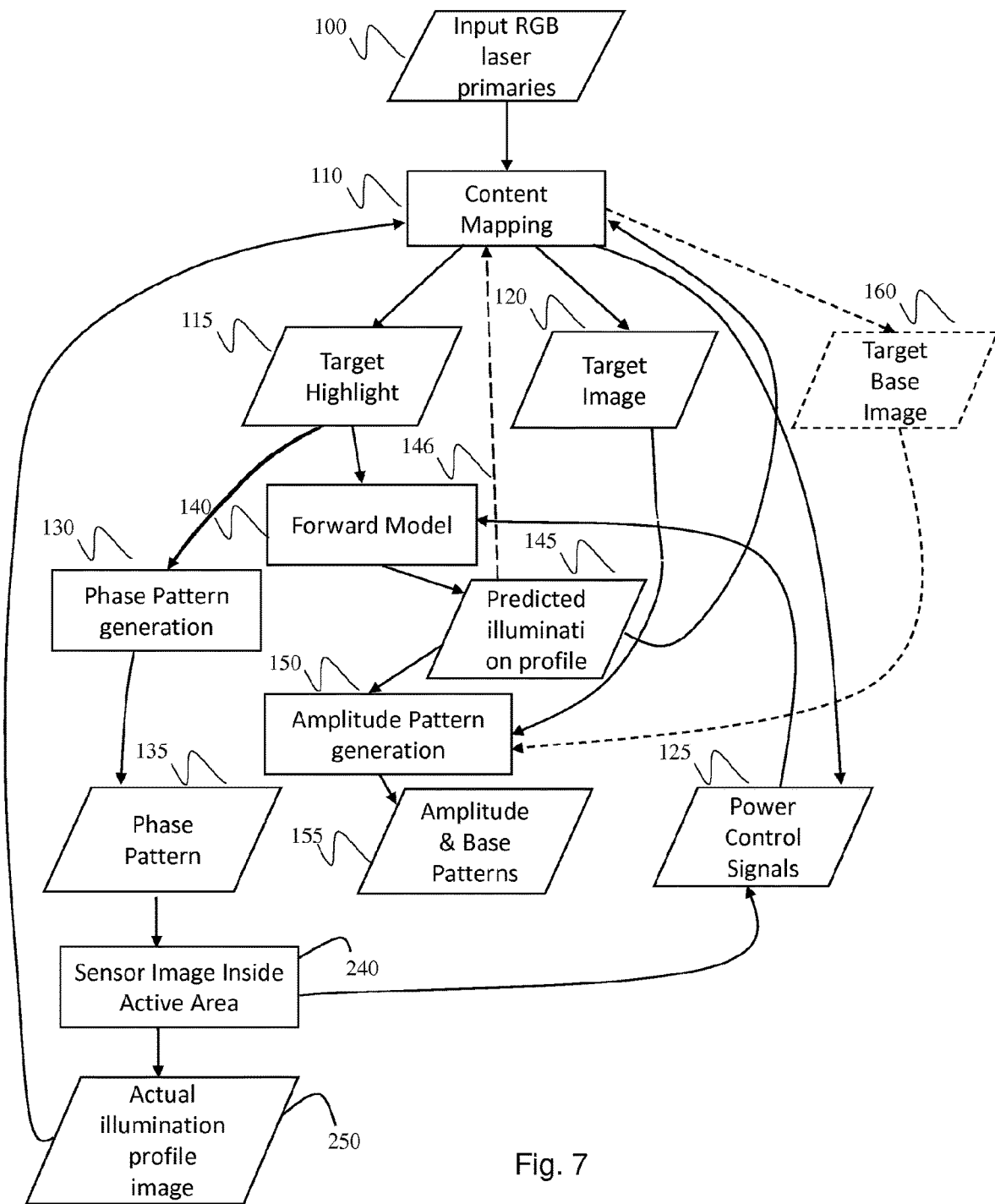
FIG. 7 shows a flow diagram with a feedback loop with real time calibrations according to an embodiment of the present invention.

The image (Sensor Image 240 Inside Active Area) captured by the image sensor 7 in the active area (the actual illumination profile) and the predicted illumination profile from the previous image frame can also be taken as an input to the content mapping block, together with the input image of the current frame, as shown in the block diagram of FIG. 7. The flow diagram in FIG. 7 has functional blocks—see table 1.

In portions of the image where the content is static (input image for the current image frame is substantially identical or identical to the previous image frame), the predicted illumination profile is compared to the actual illumination profile When the actual illumination profile is higher than the predicted illumination profile, the target image is attenuated by the same factor (actual/predicted).

When the actual illumination profile is lower than the predicted illumination profile, but still sufficient, the target image is multiplied by the same factor (actual/predicted).

When the actual illumination profile is lower than the predicted illumination profile, and no longer sufficient, the target highlight is increased to deliver sufficient brightness, while at the same time the target image is multiplied (by factor actual/predicted) to compensate for the anticipated discrepancy between the newly predicted illumination profile and the actual illumination profile.

Where the content is moving, motion vectors can be derived to select the corresponding image sections out of the actual illumination profile image and predicted illumination profile image from the previous frame, and apply the same correction mechanisms described above for static content.

Where content has no relation with the previous frame, the Content Mapping block 110 is executing the standard algorithm, ignoring both the predicted and actual illumination profile information from the previous frame.

The main problem with the sensor is that it supplies the information a frame too late. The illumination profile pattern needs to be there first before the image sensor can start sensing. Only at the end of the image sensor frame is the information available. Thus, the actual illumination profile information is only available 1 frame later. The image sensor can run faster than the projector (as explained later in the description, in reference to FIG. 10) where the image sensor runs at sub-frame speed and a first feedback is available before the frame finishes. The information of the previous frame can also be used, but only on the condition that the content is static.

3. Real-Time Feedback to Adjust the Drive Signal of the Amplitude Modulator

Figure 8:
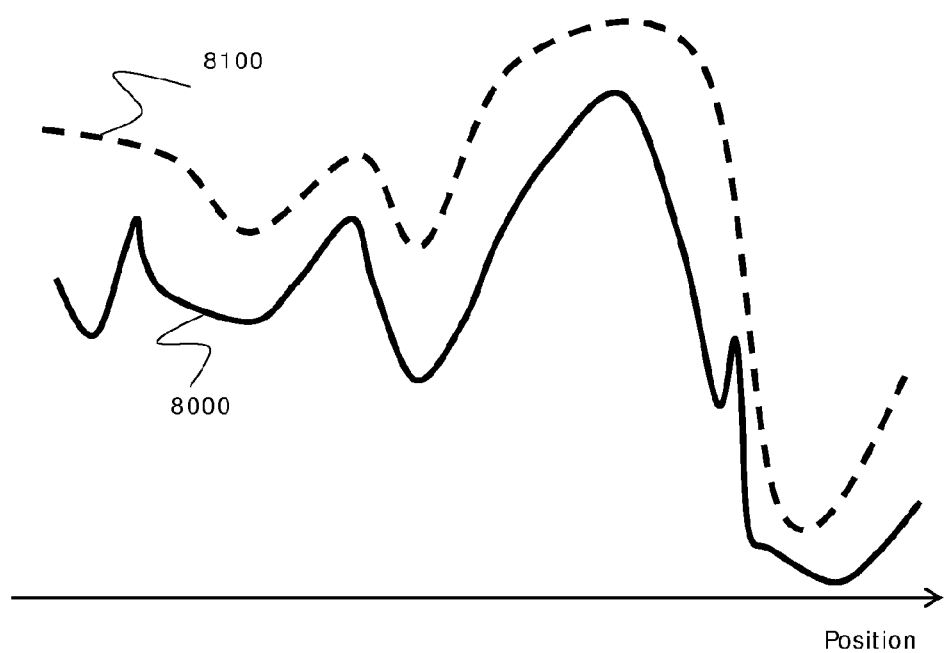
FIG. 8 shows an example of an illumination profile across an image line in a predicted illumination profile and in a target image according to an embodiment of the present invention.

For this third embodiment according to the present invention, the following approach is used:

In this embodiment, it is assumed that the aim is not to achieve accurate brightness levels but illumination brightness levels that are higher than the target image brightness level (e.g. 0-50% higher). This assumption provides some tolerance for errors. It is important to note that the illumination pattern delivered by the light steering will be somewhat diffused; in part because of the deviation of the illumination beam from the perfect collimated beam, and this can be (deliberately) reinforced by the moving diffuser which is slightly offset with respect to the focal plane of the relay optics before the amplitude modulator (4 and 11). The predicted illumination profile brightness levels should always exceed the target image brightness level (also the fine detail peaks), as shown in FIG. 8. The predicted illumination profile can already take into account the blurring as well as the efficiency of the diffuser. However, the amplitude modulator can only attenuate or reduce brightness. If the illumination profile does not provide enough light even if the amplitude modulator is driven at its maximum, the target image could then not be reproduced.

As previously described, the image sensor 7 receives a small portion of the light which is substantially optically equivalent to the illumination pattern on the second modulator, i.e. the Actual Illumination Profile Image (e.g. by means of a high-speed CMOS or CCD camera sensor). In this configuration, it is preferable that the image sensor 7 is driven at a multiple of the frame frequency of the amplitude modulators.

The image sensor 7 can be positioned behind a semi-transparent folding mirror in the optical path at a position optically equivalent to the position of the second modulator, as described above.

The actual measured illumination brightness pattern of the actual illumination profile image acquired with the image sensor 7, after linearization and normalization, is used to determine/adapt the driving signal of the second modulator (amplitude modulator). This does not necessarily mean that the second modulator can only be addressed once the brightness pattern is known. For example, in case of a PWM addressed second modulator (e.g. a spatial amplitude modulator such as a DMD), the PWM scheme can be started going by the estimated brightness (Predicted Illumination profile 145) from the Forward Model 140 or assuming that the target illumination brightness level (Target highlight) will be exactly matched. When later in the frame the actual measured illumination brightness pattern (Actual Illumination profile) is known the residual PWM scheme can be corrected to compensate for differences. Where the actual measured illumination brightness is higher than the target illumination brightness, the residual PWM duty cycle can be reduced to compensate for the increased illumination in the next sub-frame as well as the already delivered excess brightness during the first sub-frame(s). Where the actual measured illumination brightness is lower than the target illumination brightness, the residual PWM duty cycle can be increased to compensate for the reduced illumination in the next sub-frame as well as the missing brightness during the first sub-frame(s).

Figure 9:
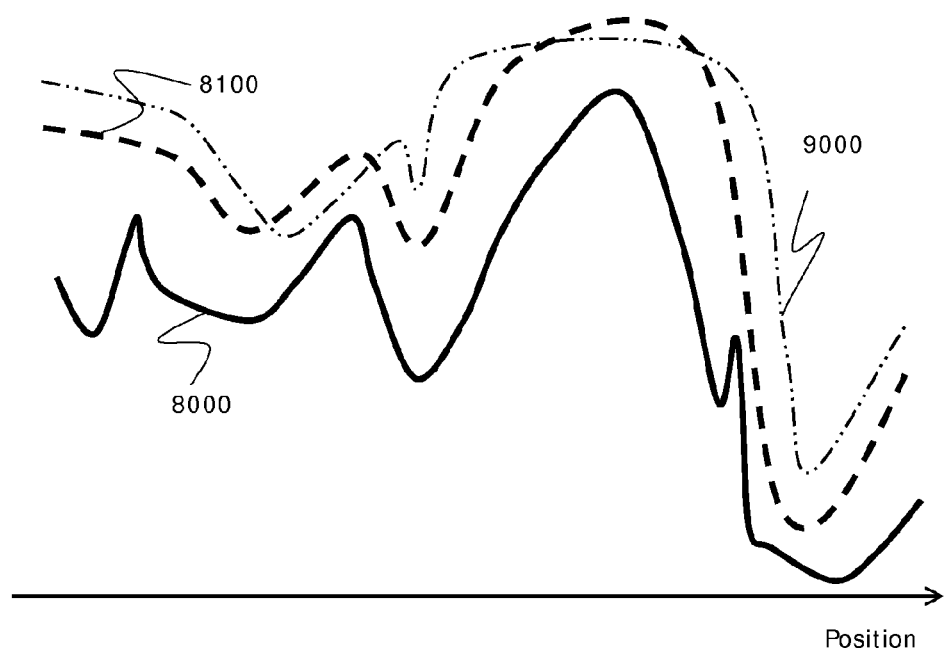
FIG. 9 is identical to FIG. 8 but further shows the illumination profile in an actual illumination profile.

FIG. 9 shows the pixel brightness profiles across a row of pixels, where the x-axis is the horizontal position of the pixel. The solid line 8000 indicates the target image brightness finally delivered after the second modulator. The dotted line 8100 indicates the predicted illumination profile signal, while the dashed-dotted line 9000 indicates the actual illumination profile signal as derived with the image sensor 7.

During the first subframe(s) having a duration ti, the information from the image sensor 7 is not yet available. The drive signal for the second modulator (Amplitude Pattern) is now calculated as:

$$Ampl1 = \frac{\text{Target Image}}{\text{Predicted Backlight}}$$

During the remaining time of the frame with a duration t frame—tithe actual illumination profile as measured by the image sensor can be used (after normalization to maximum white level) and a correction term to adjust for the error made during the initial sub-frame(s) is applied.

$$Ampl2 = \frac{\text{Target Image}}{\text{Actual Backlight}} - \frac{(\text{Actual Backlight} - \text{Actual Backlight}) * ti \cdot \text{Target Image}*}{\text{Actual Backlight} * (tframe - ti)}$$

All these calculations should be executed in linear light space (for example using a gamma correction, or any other known transfer functions).

Figure 10:
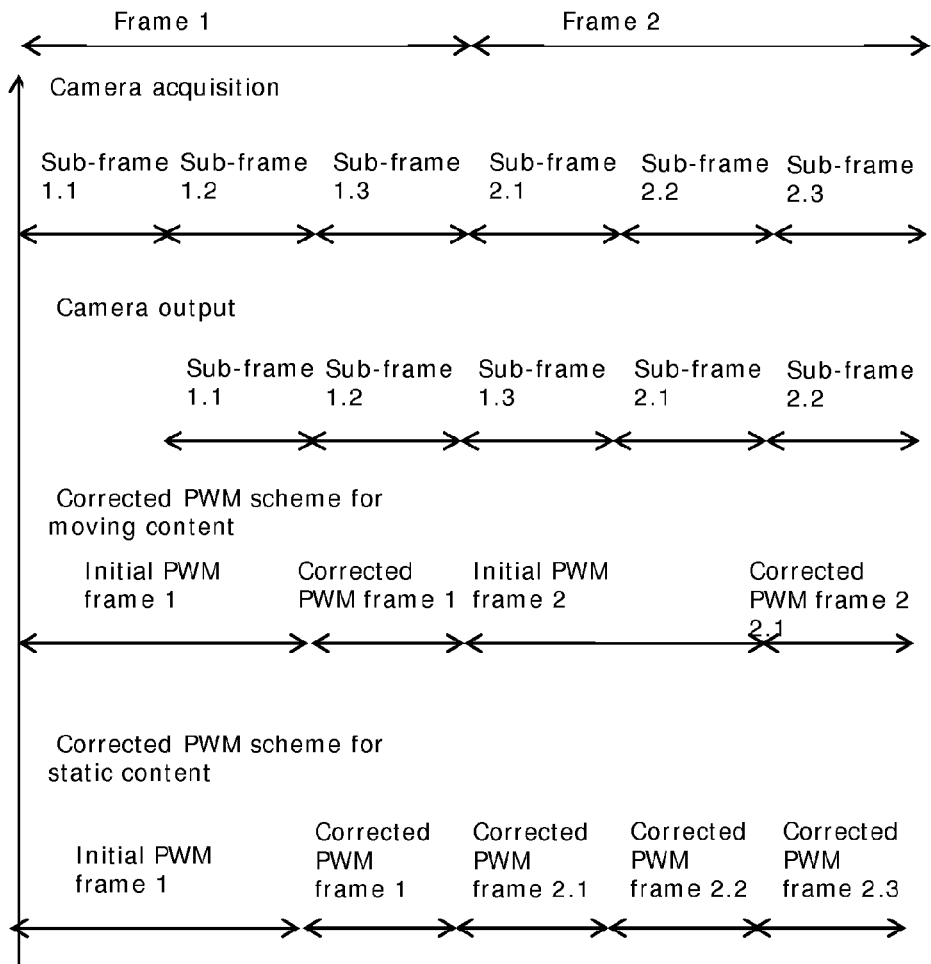
FIG. 10 is a diagram which illustrates the method applied in an embodiment according to the present invention.

FIG. 10 illustrates an example, with a camera (i.e. the image sensor 7) running at three times the frame period of the video signal. The camera output signal is delayed by ⅓ of the video frame period. Only when the output of the camera is available, the corrected PWM scheme can be calculated so it can be applied in the next sub-frame. The spatial amplitude modulator such as a DMD will be driven by an initial PWM scheme during the first 2 sub-frames. Only in the third sub-frame a corrected PWM scheme can be applied that takes into account the actual brightness level acquired by the camera in sub-frame 1.1.

In practice, and especially when a slow modulator (like an LCOS phase modulator) is used to create the beam steering, the brightness might be changing over the duration of the frame. If the content is dynamic, then the information of the last sub-frame 1.3 is of no use. For static content however, it would therefore be beneficial to use the actual brightness level acquired by the camera in all sub-frames. Brightness deviations that might have occurred during the course of frame 1 can be compensated for during the course of frame 2.

In the case of static content, the drive signal for the initial sub-frame(s) can be calculated as:

$$Ampl1 = \frac{\text{Target Image}}{\text{Predicted Backlight } pf}$$

In this case the amplitude signal for the remaining time of the frame will be calculated as:

$$Ampl2 = \frac{\text{Target Image}}{\text{Actual Backlight } cf} - \frac{(\text{Actual Backlight } cf - \text{Actual Backlight } pf) * ti \cdot \text{Target Image}*}{\text{Actual Backlight } pf * (tframe - ti)}$$

wherein the suffixes cf and pf stand for current frame and previous frame, respectively.

The generation of the drive signals towards the spatial amplitude modulator such as a DMD thus takes into account the illumination brightness level as predicted by the Forward Model 140 or by target brightness level (further called the predicted brightness level), the actual illumination brightness level as measured by the high-speed image sensor, the current target image and the target image from the previous frame. If the current target image is identical to the target image from the previous frame, it will start the frame by taking into account the ratio between the measured brightness level and the target image. If the target image is different from the previous frame, it will start the frame by taking into account the ratio between the predicted brightness level and the target image. Once the measured brightness level for the new frame is available the measured brightness level data will be used and a correction will be made for any error in the previous part of the frame because of a difference between the predicted brightness level and the measured brightness level.

The image sensor should measure the intensity in the three primary colors independently, and in this case, should be a full color sensor (e.g. with Bayer filter).

Figure 11:
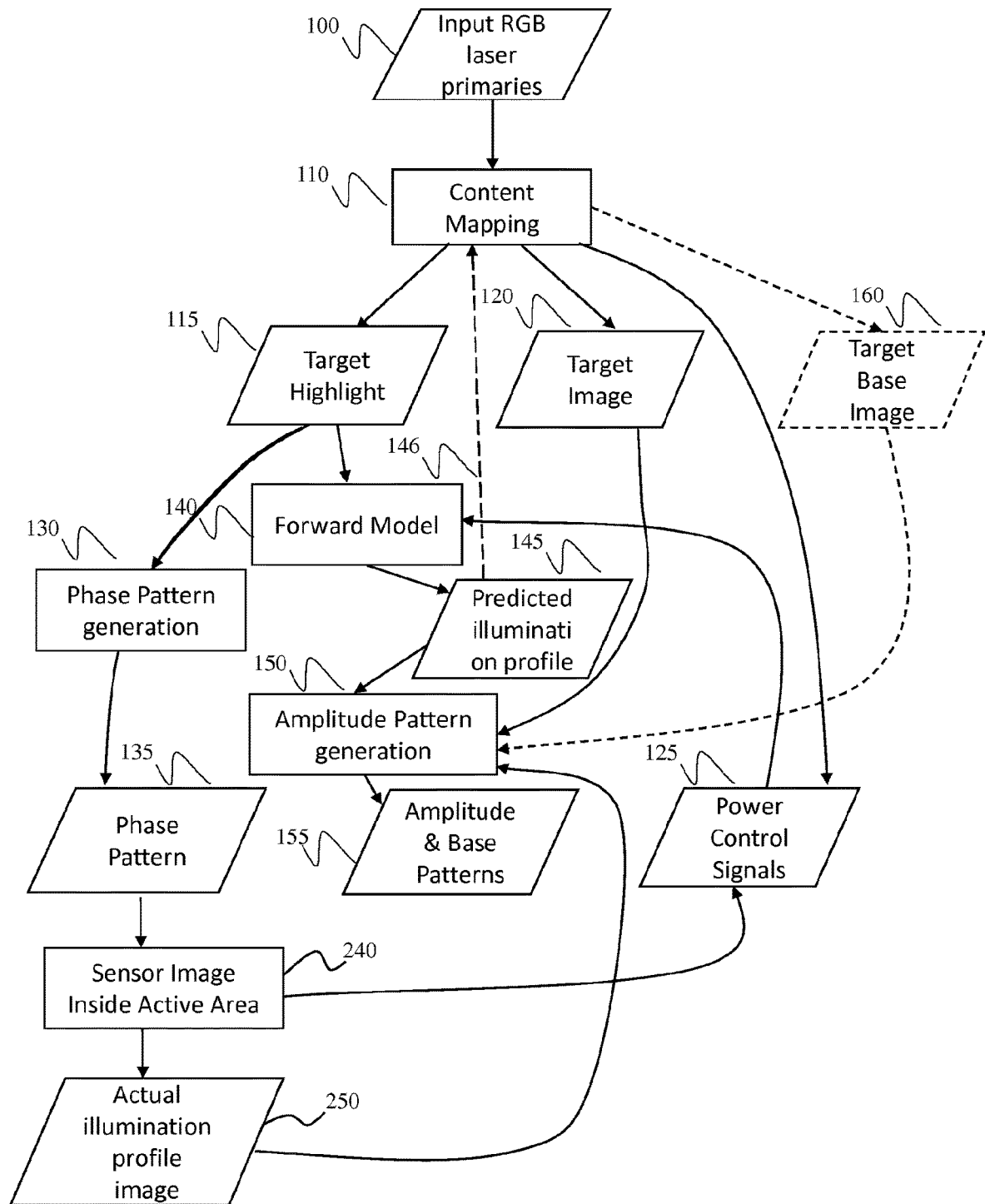
FIG. 11 shows a flow diagram with a feedback loop according to an embodiment of the present invention.

As illustrated in the flow diagram of FIG. 11, in the algorithm the actual illumination profile image captured by the image sensor is now used as an additional input to the amplitude pattern generation block, next to the predicted illumination profile signal. The flow diagram in FIG. 11 has functional blocks—see table 1.

For the calculation of the initial PWM frame, when the actual illumination profile signal is not yet available (the information available is still from the previous frame), the amplitude signal is determined from the predicted illumination profile signal and the target image.

For the calculation of the corrected PWM frame, the actual illumination profile signal is used as a basis, onto which a correction is applied to compensate for the difference between the actual illumination profile and the predicted illumination profile in the initial PWM frame. The latter compensation is weighted according to the relative time duration between the initial frame and the corrected frame(s).

As long as the actual measured illumination brightness is sufficiently high to deliver the target image brightness and compensate for any shortage in image brightness resulting from the wrong predictions used in the previous sub-frame(s), the end result should be a perfect reproduction of the target image. This is, however, on the condition that what is measured by the sensor is an accurate representation of the brightness level at the spatial amplitude modulator such as a DMD. Also, here a one-time calibration of uniformity, geometry and color sensitivity will be required. It is anticipated that such a calibration, however, would be much more stable than the highlight beam generation itself.

With this method limited drift over time and temperature of the opto-mechanical systems, the phase modulator or the laser source can be mitigated. In addition, a variation on a frame by frame basis of the unsteered component and temporal effects because of the response speed of the phase modulator can be taken into account.

In case of a hybrid projector, where both a highlight illumination and a base illumination are combined on the same amplitude modulator, the sensor 7 receives this same combination (as a fixed portion of the total illumination towards the amplitude modulator). In this case, we define the target image as the full image i.e. the combination of the target highlight and the target base. Then the method to derive the amplitude pattern generation is the same as for the highlighter projector.

4. A Hybrid Combination of Both Previous Methods

While the previous method can address various types of drift, deal with a small variable of unsteered light component, and transition effects between frames, it cannot accommodate large drifts in the steering position or in the intensity.

Figure 12:
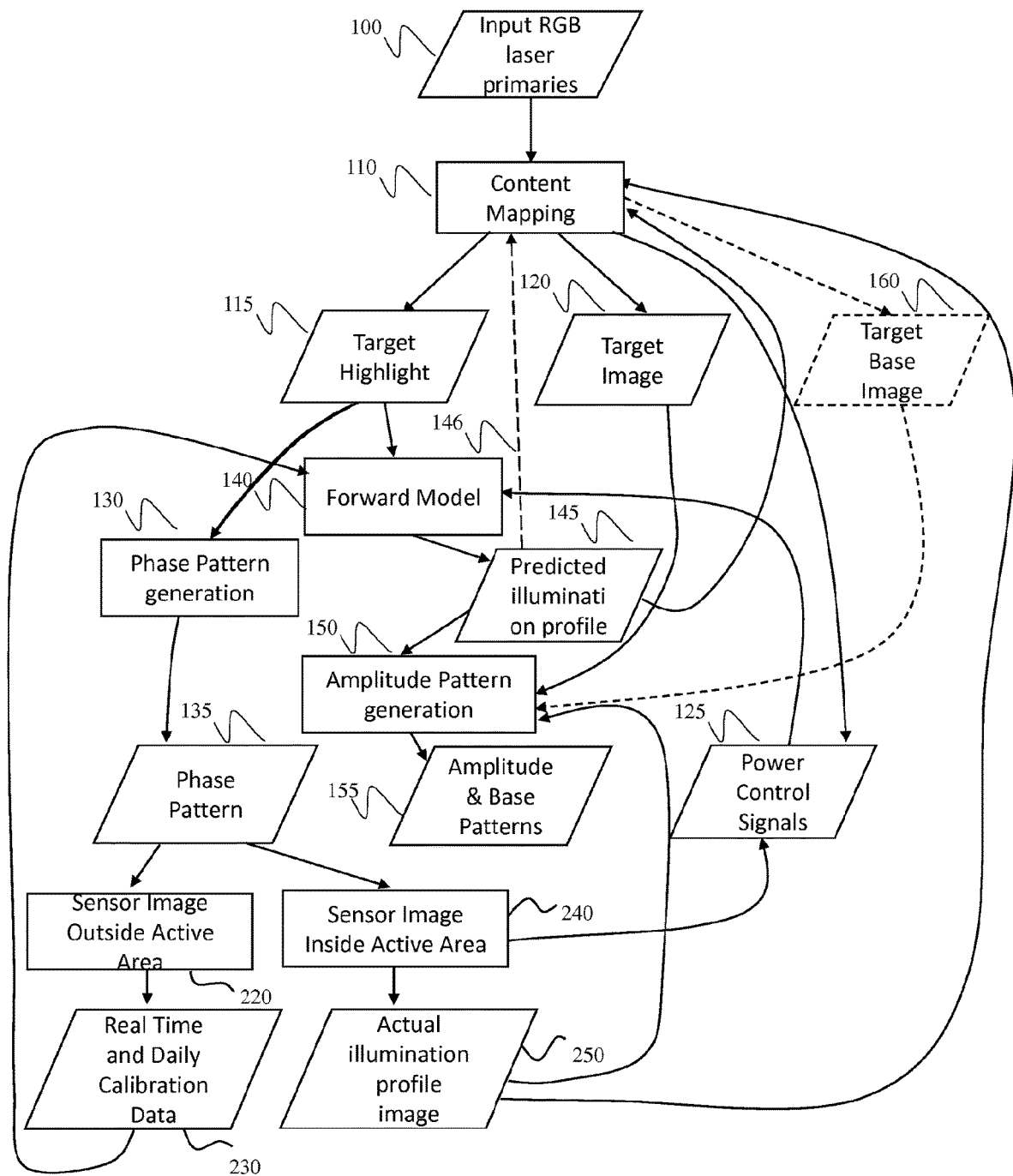
FIG. 12 shows a flow diagram with two feedback loops according to an embodiment of the present invention.

A hybrid model can be used to combine the strengths of the previous methods, as illustrated in the flow diagram of FIG. 12. The flow diagram in FIG. 12 has functional blocks—see table 1.

Here slow but potentially large drifts can be addressed by a near real-time feedback on the parameters of the forward model. And those parameters of the forward model can further be updated (e.g. on a daily basis) using a set of calibration patterns in the active area during projector shutdown. For static content any residual errors can be compensated for in the next image frame. Further a final correction including a correction for dynamic effects can be implemented using a real-time feedback on the driving signal of the amplitude modulator.

A single image sensor can be used that captures both the active area and the test patterns generated outside the active area. In other embodiments, separate image sensors could acquire different portions of the light beam which impinges on the phase modulator, for example an image sensor which images the information in the active area (or the pupil of the projection lens) and an image sensor which images the information which is outside of the active area at the plane of the diffuser.

In other embodiments, an image sensor can also be implemented to image the light beam after being reflected or transmitted by the amplitude modulator.

In embodiments of the present invention, the projector or projection system can comprise one phase modulator and an amplitude modulator in every color channel. Embodiments of the present invention can also be implemented with a projector or projection system comprising color sequential operation with one phase modulator and one amplitude modulator however current LCOS phase modulators are not fast enough. In other embodiments according to the present invention, the projector or projection system can comprise a phase modulator per channel and a single spatial amplitude modulator such as a DMD amplitude modulator operating in color sequential mode. In both color sequential modes, one would then need to pulse the red, green and blue lasers sequentially, which can have drawbacks in terms of light efficiency.

Methods according to the present invention can be performed by a control unit such as a control unit or a processing device or any control unit for use with embodiments of the present invention including microcontrollers, either as a standalone device or embedded in a projector or as part of an optical subsystem for a projector. The present invention can use a processing engine being adapted to carry out functions. The processing engine preferably has processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such a control unit or a processing device may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention, e.g. as itemised below when the software is loaded onto the controller and executed on one or more processing engines such as microprocessors, ASIC's, FPGA's etc. Hence a processing device control unit for use with any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows™ supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:

1) receiving an input image,
2) generating a target highlight image, a target image and power control signals from the input image,
   a) generating a phase pattern for driving the phase modulator from the target highlight image,
   b) generating a predicted illumination profile image from the target highlight image,
   c) generating an amplitude pattern for driving the amplitude modulator from the predicted illumination profile image and the target image,
3) receiving an image from the image sensor to provide feedback to at least one of the method steps 2), 2b), 2c) for driving the projector system.

The software embodied in the computer program product is adapted to carry out the following functions when the software is loaded onto the respective device or devices and executed on one or more processing engines such as microprocessors, ASIC's, FPGA's etc.:

generating a target highlight image, a target image, power control signals and a target base image from the input image,
generating the predicted illumination profile image from the target highlight image further from as input the real-time calibration patterns from the addressable area of the image sensor and the periodic calibration patterns from the active area of the image sensor.
generating calibration patterns in the addressable area.

The software embodied in the computer program product is adapted to carry out the following functions when the software is loaded onto the respective device or devices and executed on one or more processing engines such as microprocessors, ASIC's, FPGA's etc.:

generating a target highlight image, a target image and power control signals from the input image for frame n+1 from the slowly varying content of the real-time illumination profile image acquired during frame n of the input image.
using motion detection means, wherein the motion detection means are configured to determine which part of the input image frame is static between two consecutive frames and which part is dynamic.
using means to decide on a pixel or region basis which part of the image is static or slowly varying and which part of the image is dynamic.
comparing in regions or for the pixels of the input image where the content is static, the predicted illumination profile to the actual illumination profile
   when the actual illumination profile is higher than the predicted illumination profile, the target image is attenuated by the ratio of the actual illumination profile to the predicted illumination profile,
   when the actual illumination profile is lower than the predicted illumination profile, but still sufficient, the target image is multiplied by the same ratio of the actual illumination profile to the predicted illumination profile,
   when the actual illumination profile is lower than the predicted illumination profile, and is too faint, the target highlight is increased to deliver sufficient brightness, while at the same time the target image is multiplied by the same ratio of the actual illumination profile to the predicted illumination profile.

The software embodied in the computer program product is adapted to carry out the following functions when the software is loaded onto the respective device or devices and executed on one or more processing engines such as microprocessors, ASIC's, FPGA's etc.:

generating a target highlight image, a target image and power control signals from the input image from the input image for frame n further uses input from the predicted illumination profile image.
generating an amplitude pattern for driving the amplitude modulator for frame n+1 from the predicted illumination profile image and the target image from the actual illumination profile image of the previous frame n or sub-frame when driven at a multiple frequency of the amplitude modulator.
generating a base pattern when receiving as additional input the target base image.

The software embodied in the computer program product is adapted to carry out the following functions when the software is loaded onto the respective device or devices and executed on one or more processing engines such as microprocessors, ASIC's, FPGA's etc.:

Generating a highlight image with a portion of the light processed by the phase modulator on the amplitude modulator and generating a base image with another portion of the light uniformly distributed on the amplitude modulator.

The software embodied in the computer program product is adapted to carry out the following functions when the software is loaded onto the respective device or devices and executed on one or more processing engines such as microprocessors, ASIC's, FPGA's etc.:

monitoring the light levels provided by at least one laser source in a projector system,
comparing the light intensity within at least one of the active area and the addressable area with a threshold,
reducing the power or shutting down the laser source with the power control signals when the measured light intensity is higher than the threshold.

The software embodied in the computer program product is adapted to carry out the following functions when the software is loaded onto the respective device or devices and executed on one or more processing engines such as microprocessors, ASIC's, FPGA's etc.:

the at least a portion of the illumination pattern substantially equivalent to the illumination pattern incident on the amplitude modulator can be a scaled down version, e.g. the scaled down version can be less than 1:1.

Making use of the image sensor being positioned in the path of those optical elements that generate the highlight.

The software embodied in the computer program product is adapted to carry out the following functions when the software is loaded onto the respective device or devices and executed on one or more processing engines such as microprocessors, ASIC's, FPGA's etc.:

any discrepancy between the amplitude modulator image and the camera image can be mitigated by image processing.

the image sensor can be arranged to receive light from reflected light of an inserted glass plate rather than the image sensor being placed behind a folding mirror.

The software embodied in the computer program product is adapted to carry out the following functions when the software is loaded onto the respective device or devices and executed on one or more processing engines such as microprocessors, ASIC's, FPGA's etc.:

Operating the camera at a higher frame rate and sampling is at lower resolution when the camera is used to monitor laser safety.

Arranging a switch to provide switching to a higher resolution to perform calibration.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid-state memory such as a USB flash memory, a ROM, etc.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A method of driving a projector system comprising a light source, a phase modulator and at least one amplitude modulator, the phase modulator being configured to generate a highlight image incident on the amplitude modulator, the projector system further comprising at least one image sensor configured to receive at least a portion of an illumination pattern substantially equivalent to an illumination pattern incident on the amplitude modulator, the method comprising the steps of:
   1) receiving an input image,
   2) generating a target highlight image, a target image and light source power control signals from the input image,
      a) generating a phase pattern for driving the phase modulator from the target highlight image,
      b) generating a predicted illumination profile image from the target highlight image,
      c) generating an amplitude pattern for driving the amplitude modulator from the predicted illumination profile image and the target image,
   3) receiving an image from the image sensor to provide feedback to at least one of the method steps 2), 2b), 2c) for driving the projector system,
   wherein one of the at least one image sensor comprises an addressable area and one of the at least one image sensor comprises an active area, and wherein the addressable area is configured to provide real-time calibration patterns and the active area is configured to provide periodic calibration patterns, and
   wherein the step of generating the predicted illumination profile image from the target highlight image further comprises as input the real-time calibration patterns and the periodic calibration patterns.

2. The method according to claim 1, wherein the at least one image sensor is running at a multiple of the frame frequency of the input image.

3. The method according to claim 1, wherein the projector system further comprises a second amplitude modulator and wherein the step of generating a target highlight image, a target image and power control signals from the input image, further comprising the at least one first amplitude modulator generating a target base image.

4. The method according to claim 1, wherein calibration patterns are generated in the addressable area.

5. The method according to claim 1, wherein one of the at least one image sensors comprises an active area, and wherein the image sensor is configured to acquire a real-time illumination profile image within the active area, said real-time illumination profile image comprising slowly varying content between frame n and frame n+1, and wherein a step of generating a target highlight image, a target image and light source power control signals from the input image for frame n+1 further uses input from the slowly varying content of the real-time illumination profile image acquired during frame n of the input image.

6. The method according to claim 1, further comprising motion detection means, wherein the motion detection means are configured to determine which part of the input image frame is static between two consecutive frames and which part is dynamic.

7. The method according to claim 6, further comprising means to decide on a pixel or region basis which part of the image is static or slowly varying and which part of the image is dynamic, wherein in regions or for the pixels of the input image where the content is static, the predicted illumination profile is compared to the actual illumination profile
   when the actual illumination profile is higher than the predicted illumination profile, the target image is attenuated by the ratio of the actual illumination profile to the predicted illumination profile,
   when the actual illumination profile is lower than the predicted illumination profile, but still sufficient, the target image is multiplied by the same ratio of the actual illumination profile to the predicted illumination profile,
   when the actual illumination profile is lower than the predicted illumination profile, and is too faint, the target highlight is increased to deliver sufficient brightness, while at the same time the target image is multiplied by the same ratio of the actual illumination profile to the predicted illumination profile.

8. The method according to claim 5, wherein the step of generating a target highlight image, a target image and light source power control signals from the input image for frame n further uses input from the predicted illumination profile image.

9. The method according to claim 1, wherein a step of generating an amplitude pattern for driving the amplitude modulator for frame n+1 from the predicted illumination profile image and the target image further uses as input the actual illumination profile image of the previous frame n or sub-frame when the image sensor is driven at a multiple frequency of the amplitude modulator.

10. The method according to claim 3, further comprising generating a base pattern when receiving as additional input the target base image.

11. The method according to claim 1, wherein a portion of the light from the light source is processed by the phase modulator to generate a highlight image on the amplitude modulator and another portion of the light is uniformly distributed on the amplitude modulator to provide a base image.

12. The method according to claim 1, wherein the at least a portion of the illumination pattern substantially equivalent to the illumination pattern incident on the amplitude modulator is a scaled down version.

13. The method according to claim 1, wherein the image sensor is positioned in the path of optical elements that generate a highlight.

14. A method for monitoring the light levels provided by at least one laser source in a projector system, said at least one laser source being driven by power control signals, the projector system comprising a phase modulator and at least one amplitude modulator, the phase modulator being configured to generate a highlight image incident on the amplitude modulator, the projector system further comprising at least one image sensor configured to receive at least a portion of an illumination pattern substantially equivalent to an illumination pattern incident on the amplitude modulator, the image sensor comprising at least one of an active area and an addressable area, the method comprising the steps of:
    comparing the light intensity within at least one of the active area and the addressable area with a threshold,
    reducing the power or shutting down the laser source with the power control signals when the measured light intensity is higher than the threshold.

15. A projector system comprising:
    a phase modulator and at least one amplitude modulator, the phase modulator being configured to generate a highlight image incident on the amplitude modulator,
    the projector system further comprising at least one image sensor configured to receive at least a portion of an illumination pattern substantially equivalent to an illumination pattern incident on the amplitude modulator, the phase modulator, amplitude modulator and image sensor being controlled by a driver, and further comprising a feedback loop for providing the output of the image sensor to the driver,
    wherein the phase modulator and the amplitude modulator are arranged on an optical path; the phase modulator steering a light beam to an intermediate image, said image sensor and amplitude modulator receiving light from said intermediate image such that the optical path between said image sensor and intermediate image is substantially optically equivalent to the optical path between the spatial light amplitude modulator and the intermediate image.

16. The projector system according claim 15, wherein a portion of the light from the light source is processed by the phase modulator to generate a highlight image on the amplitude modulator and another portion of the light is uniformly distributed on the amplitude modulator to provide a base image.

17. The projector system according to claim 15, wherein illumination brightness levels are 0-50% higher than a target image brightness level.

18. A non-transitory signal storage medium storing a computer program product comprising software which when executed on one or more processing engines, performs a method of claim 1.

19. The method according to claim 6, further comprising means to decide on a pixel or region basis which part of the image is static or slowly varying and which part of the image is dynamic.

20. The method according to claim 1, wherein the image sensor is arranged to receive light from reflected light of an inserted glass plate rather than the image sensor being placed behind a folding mirror.

21. The projector system according to claim 15, wherein the intermediate image is on a diffuser.

22. The projector system according to claim 15, wherein the image sensor is arranged to receive light from reflected light of an inserted glass plate rather than the image sensor being placed behind a folding mirror.

* * * * *